United States Patent

[11] 3,581,915

[72] Inventor Sanford Saul
 Cleveland, Ohio
[21] Appl. No. 760,873
[22] Filed Sept. 19, 1968
[45] Patented June 1, 1971
[73] Assignee The Triax Company
 Cleveland, Ohio

[54] STACKER CRANE POSITION CONTROL SYSTEM WITH AN AUXILLARY VERIFYING MEANS
12 Claims, 23 Drawing Figs.

[52] U.S. Cl. .................................................. 214/16.4A,
 187/29
[51] Int. Cl. ..................................................... B65g 1/06
[50] Field of Search............................................ 214/16.4,
 16.42; 187/29; 318/320.1

[56] References Cited
UNITED STATES PATENTS
2,988,237 6/1961 Devol .......................... 214/11
3,219,207 11/1965 Chasar ......................... 214/16.4(2)
3,402,836 9/1968 Debrey et al. ................ 214/16.4(2)

Primary Examiner—Gerald M. Forlenza
Assistant Examiner—Raymond B. Johnson
Attorney—Baldwin, Egan, Walling & Fetzer ABSTRACT: An automatic warehousing system comprising a storage structure defining a plurality of load-handling locations, and an automatic load carrier for delivering loads to and picking up loads from the load-handling locations, with the control system for the load carrier including command-receiving and movement-determining means for controlling the movement of the load carrier to a selected load-handling location, and with verifying means coacting with the control means for verifying the accuracy of the positioning of the load carrier at selected load-handling locations prior to final handling of loads by the load carrier at the selected storage locations.

INVENTOR.
SANFORD SAUL

INVENTOR.
SANFORD SAUL
BY
Baldwin, Egan, Walling & Fetzer
ATTORNEYS

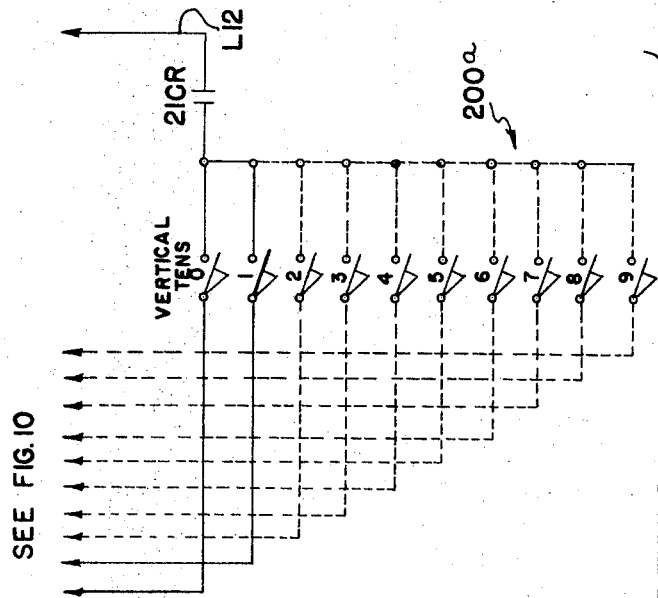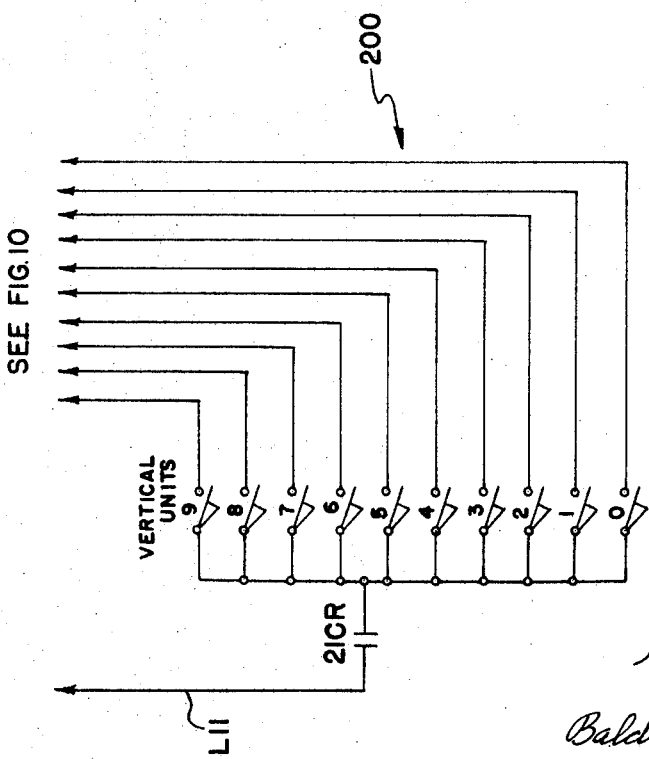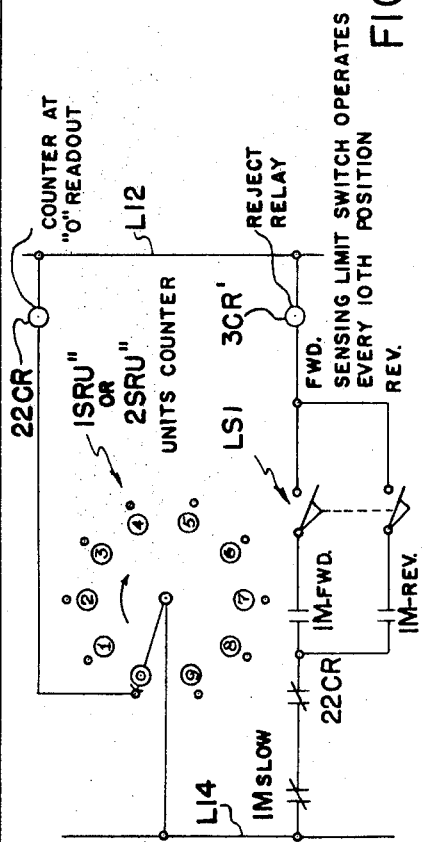

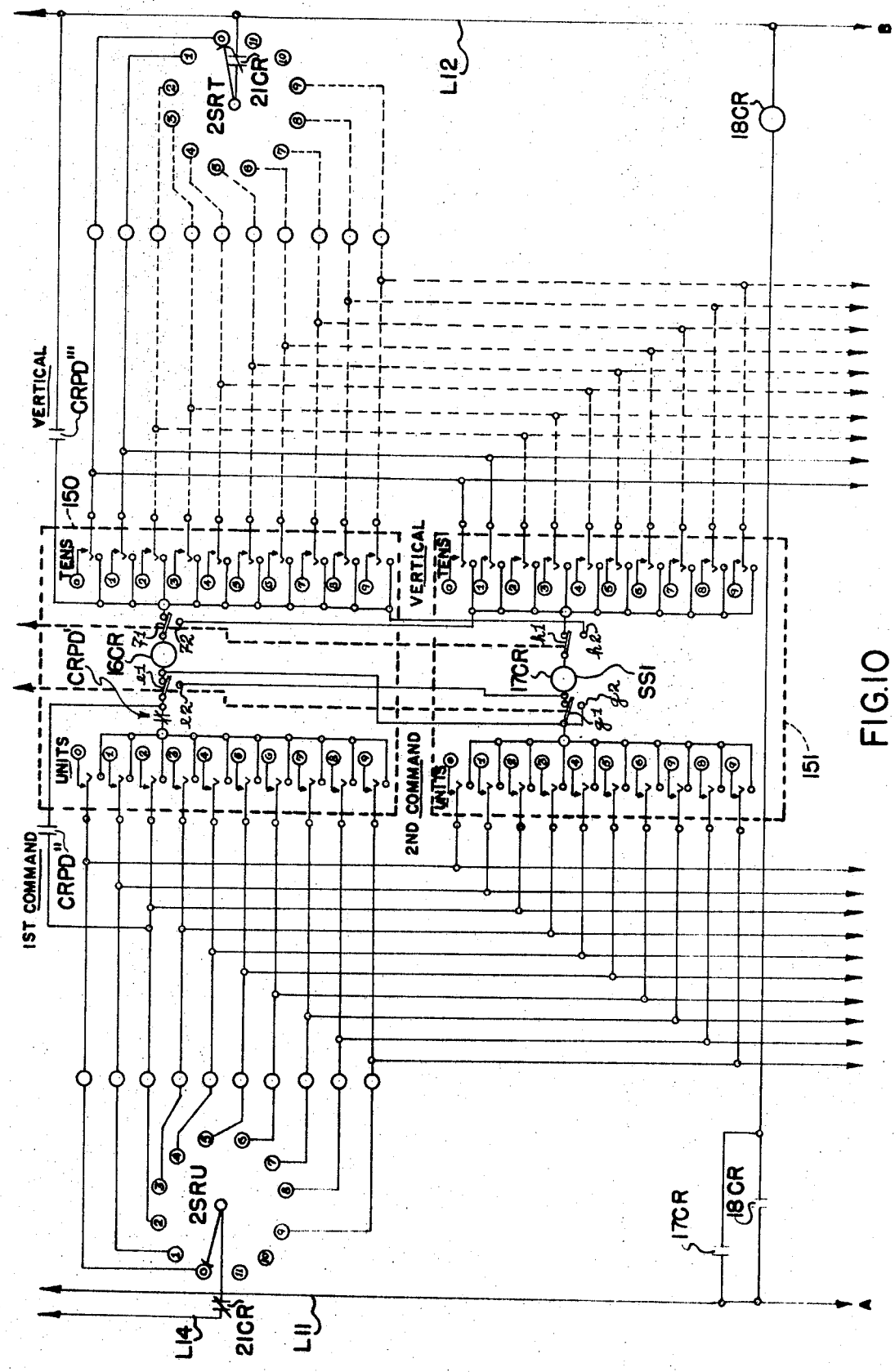

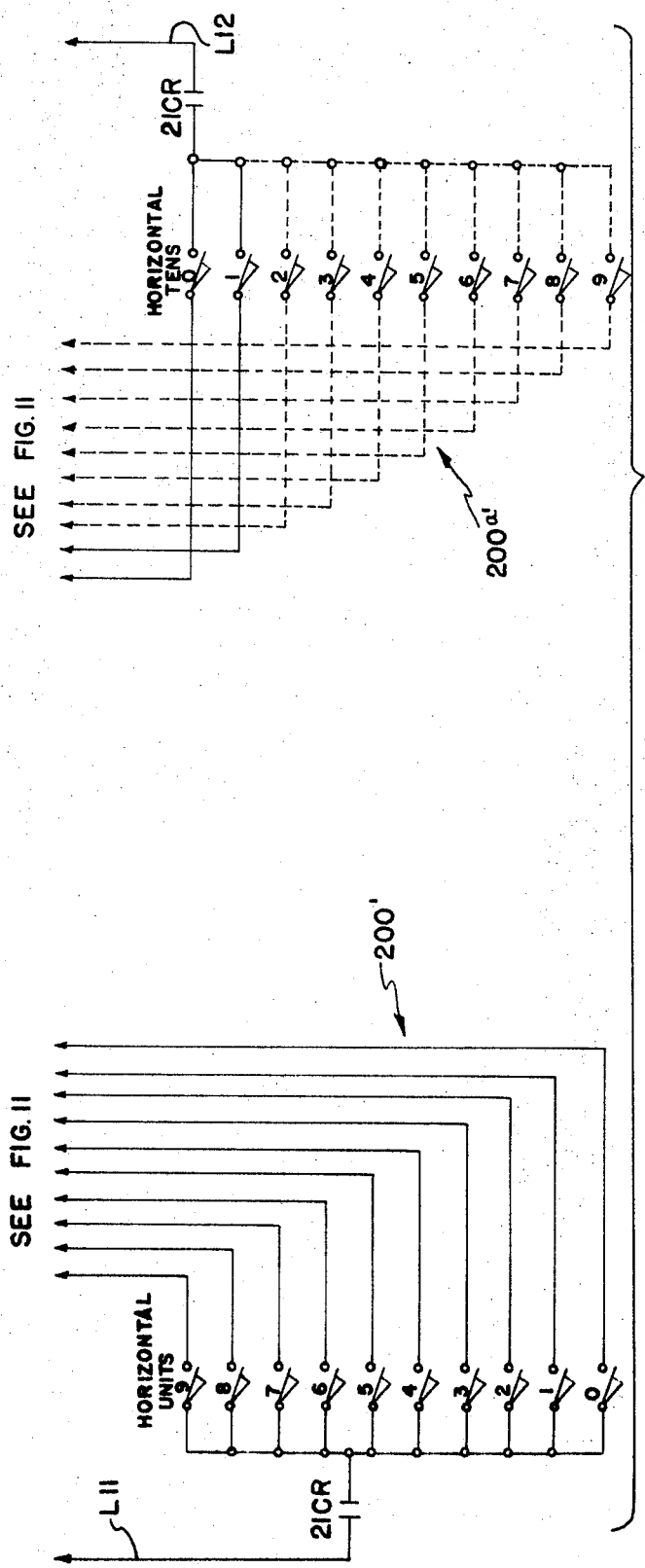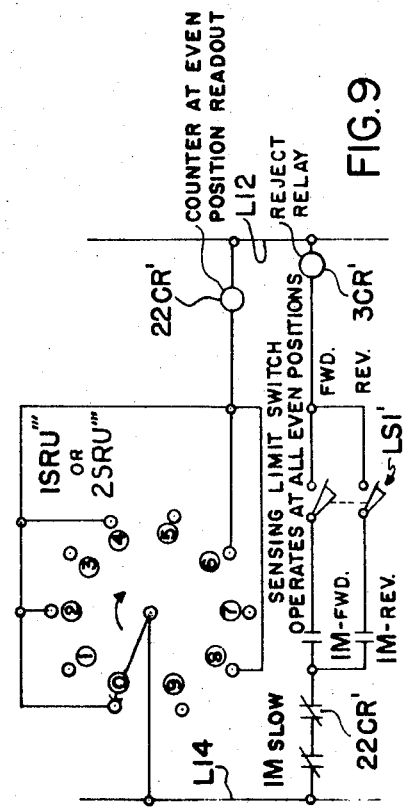

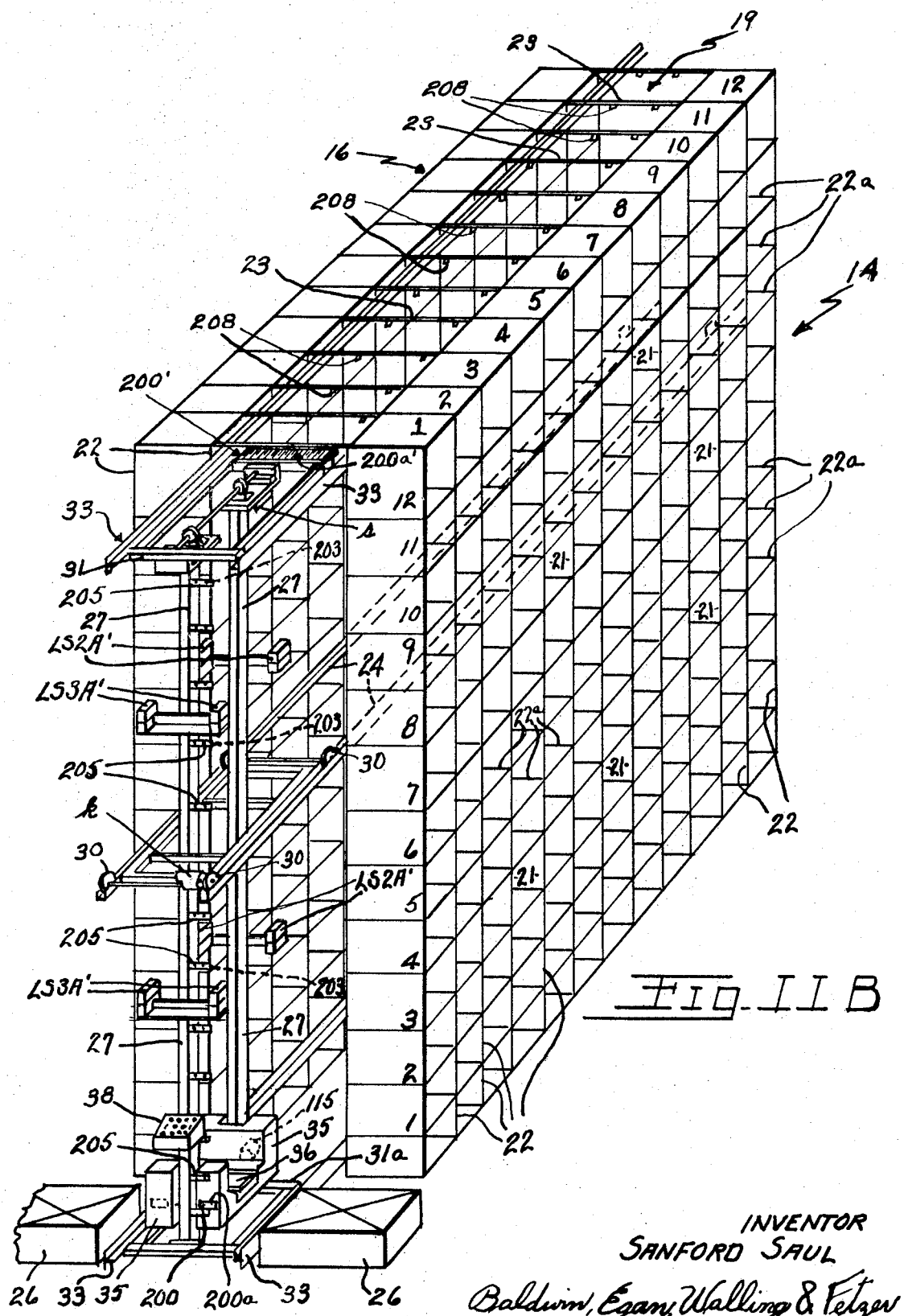
FIG. IIB

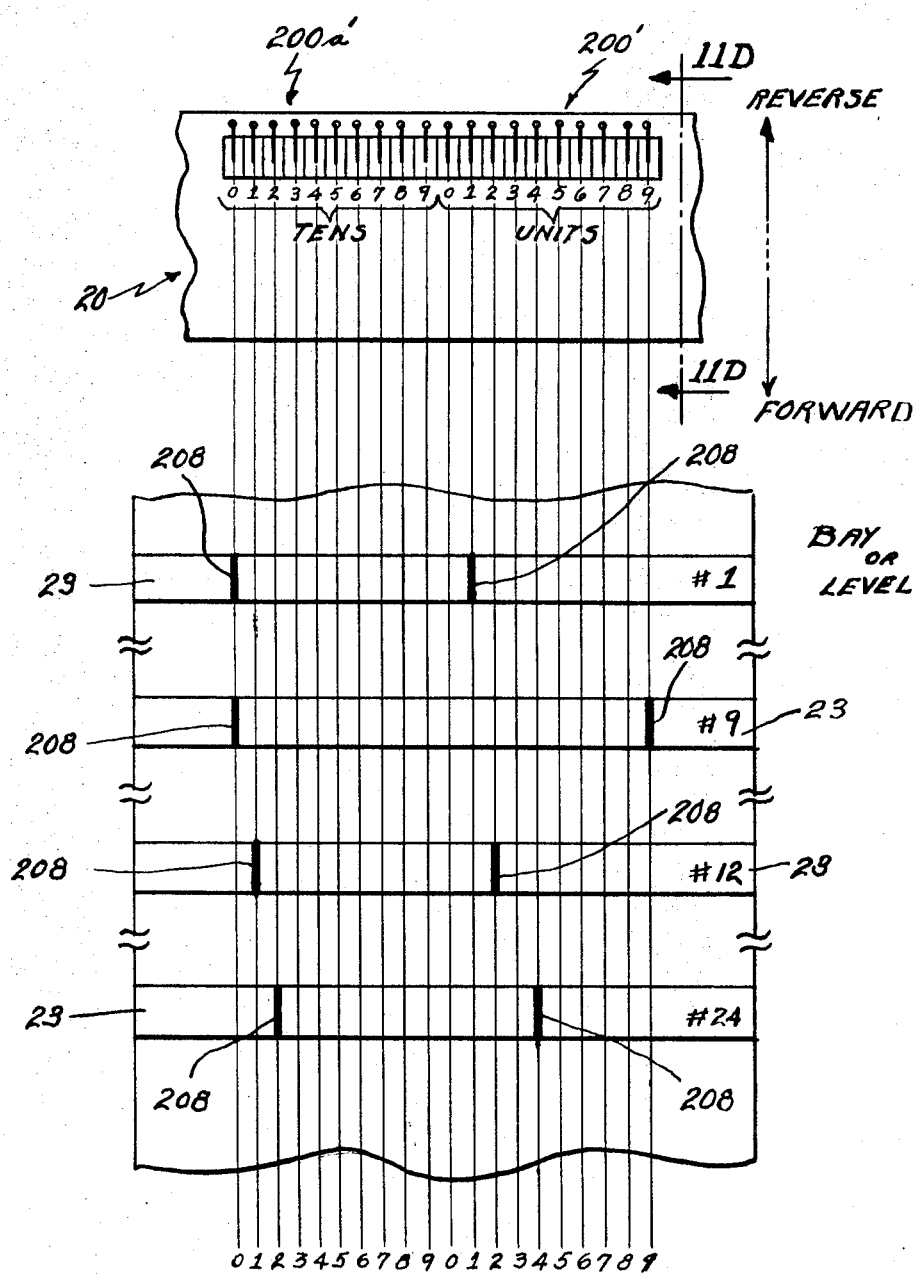

STACKER CRANE POSITION CONTROL SYSTEM WITH AN AUXILLARY VERIFYING MEANS

This invention relates in general to automatic warehousing systems for storing and unstoring loads by transferring them between a movable load carrier and a storage frame comprising columns of stacked storage means or bins, and more particularly relates to a warehousing arrangement including means for checking the accuracy of the command-receiving and movement-determining control circuitry of system for verifying the load carrier movements and its position at a selected load-handling storage location in its load-handling cycle of retrieving loads from and/or depositing loads into the storage frame of the system.

Due to occasional malfunctioning of certain of the control elements of the command-receiving and movement-determining control circuitry of an automatic warehouse system incorporating a movable load carrier which is adapted to be directed to a selected storage bin or storage location in a storage frame, the load carrier is sometimes inaccurately positioned at a location in the storage frame, thereby causing problems when an attempt is made to place a load in a storage bin that is already occupied, or removal of a load occurs from a storage bin that has the wrong or nonselected type of load therein.

The present invention provides a reliability check of the control system that determines the movement of the load carrier, to insure that all of the components of the control system have functioned properly and have operated to accurately position the load carrier at the selected storage bin in the storage frame prior to actuation of the laterally movable extractor, the latter upon actuation being operable to deposit a load into or remove a load from the selected bin. This may be accomplished in accordance with one embodiment of the invention by employing duplicate sets of counters or stepping switches in the control system and also duplicate sets of sensors which transmit a signal to the respective counter or stepping switch. Each sensor (which may take the form of a mechanically responsive limit switch, or a magnetically responsive switch, or a photoelectric switch) detects its own associated actuator, and the matching readout contacts of the counters are connected in series and these are connected in series with matching contacts of the programming selector transmitter of the system. Both steppers must match with each other as well as with the programmed information or commands at the selector transmitter before a readout signal can be transmitted to the power means for the laterally movable extractor of the load carrier, for directing the load carrier extractor to move into the selected storage bin in the storage frame.

In another embodiment, a spot checking of the counters occurs rather than at every counter contact position, such as for instance every 10th contact position of the counter, or at every even or every odd position of the counter contacts, by providing sensors coacting with the counters at regular intervals along the path of movement of the load carrier (e.g. every 10th bin column and every 10th bin level, or every even or every odd bin column and bin level interval) with the sensor being operable to actuate a reject circuit in the event that the position of the load carrier as indicated by the counter does not correspond to the load carrier position as indicated by the sensor.

In a further embodiment verifying sensors are provided for every bin column and bin level location which sensors are actuated into conductive condition by respective actuators when the load carrier arrives at the selected storage bin, and with such verifying actuators being in circuit with the command-receiving and movement-determining circuitry of the system so that if the actuated verifying sensors to not correspond with the position of the load carrier as indicated by the programming selector transmitter control, the load carrier extractor will be prevented from handling a load at the existing position of the load carrier.

Accordingly, an object of the invention is to provide a novel warehousing system incorporating therein reliability check means for verifying the accuracy and proper functioning of the command-receiving and movement-determining controls of the control circuitry of the system.

Another object of the invention is to provide an automatic warehousing system which includes a storage frame and a powered load carrier movable in a travel zone alongside of the storage frame for inserting loads into and removing loads from the storage frame, and with there being control means for the load carrier for automatically controlling the movement of the load carrier to a selected bin or load-handling storage location, for depositing a load therein or withdrawing a load therefrom, and with such control means including counting means for controlling the movement of the load carrier to the selected storage bin in the storage frame and with there being provided pulse-generating sensor means for transmitting a signal to counters or stepping switches of the control circuitry for actuating the latter, and including an original set and an auxiliary set of said counting and sensor means with said original and auxiliary sets of counting means being in circuit with the programming selector transmitter, and with the matching readout contacts of the original and auxiliary counters being connected in series for checking the proper functioning of the original counters and sensors, in the load-handling cycle of the load carrier.

A further object of the invention is to provide an automatic warehousing system in accordance with the foregoing wherein a reliability check is made for each contact position of the original counter means of the control system.

Another object of the invention is to provide an automatic warehousing system in accordance with the foregoing wherein a reliability check is made at predetermined ones of the contact positions of the original control counters of the system, and not for each contact position of the original counter.

A still further object of the invention is to provide an automatic warehousing system which includes a storage structure defining load-handling storage locations and a powered load carrier movable horizontally, vertically and laterally to withdraw loads from and deposit loads into the storage structure and wherein verifying sensor means are provided for each load-handling storage location so that the respective sensor is actuated into conductive condition when the load carrier arrives at the selected load-handling storage location as indicated by the command-receiving and movement-determining control circuitry for the load carrier so that a check is performed to verify that the position of the load carrier as indicated by the actuated sensor corresponds to the position of the load carrier as dictated by the command-receiving and movement-determining circuitry of the load carrier, and if such positions do not correspond to one another, lateral movement of the load carrier to handle a load at the existing position is prevented.

Other objects and advantages of the invention will be apparent from the following description taken in conjunction with the accompanying drawings wherein:

FIG. 1 is a diagrammatic perspective view of an automatic warehousing system installation of the general type with which the present invention may be utilized; the system illustrated is of the general type disclosed in the copending U.S. Pat. application, Ser. No. 418,048 of Sanford Saul, filed Dec. 14, 1964 and entitled ELECTRIC CONTROL CIRCUIT FOR AN AUTOMATIC WAREHOUSING SYSTEM.

FIG. 2 is a diagrammatic fragmentary illustration of a verifying circuit embodiment wherein the command-receiving and movement control circuitry for the load carrier comprises horizontal and vertical counting means and a reliability check is made for the control sensors and associated counters of the system in the latter's operation of controlling the horizontal and vertical movements of the load carrier in its operating cycle of the depositing loads into and/or retrieving loads from the storage frame of the system, by a duplicate set of counters and associated sensors.

FIG. 3 is a schematic illustration of the connection of the original horizontal stepper switch of the control system to the units selector switches of the programming transmitter and to the respective readout relay of the automatic warehousing system, which is the same general counting arrangement illustrated in FIG. 9G of aforementioned Ser. No. 418,048. The "tens" counter and associated selector switches have been deleted from the FIG. 3 showing in the interests of simplicity, but it will be understood that such "tens" counter section will be added to the circuitry in the manner illustrated in FIG. 9G of Ser. No. 418,048 when the size of the storage structure requires the same.

FIG. 4 is a schematic illustration of auxiliary horizontal checking stepper of the verifying circuit coupled to matching selector switch contacts of the programming transmitter means and in circuit with the readout relays of the verifying system, so that the steppers of FIGS. 3 and 4 must match with one another as well as with the programmed information on the selector switches before a verified readout signal can be transmitted to the power means of the load carrier for handling a load at the programmed storage location.

Figure 6:
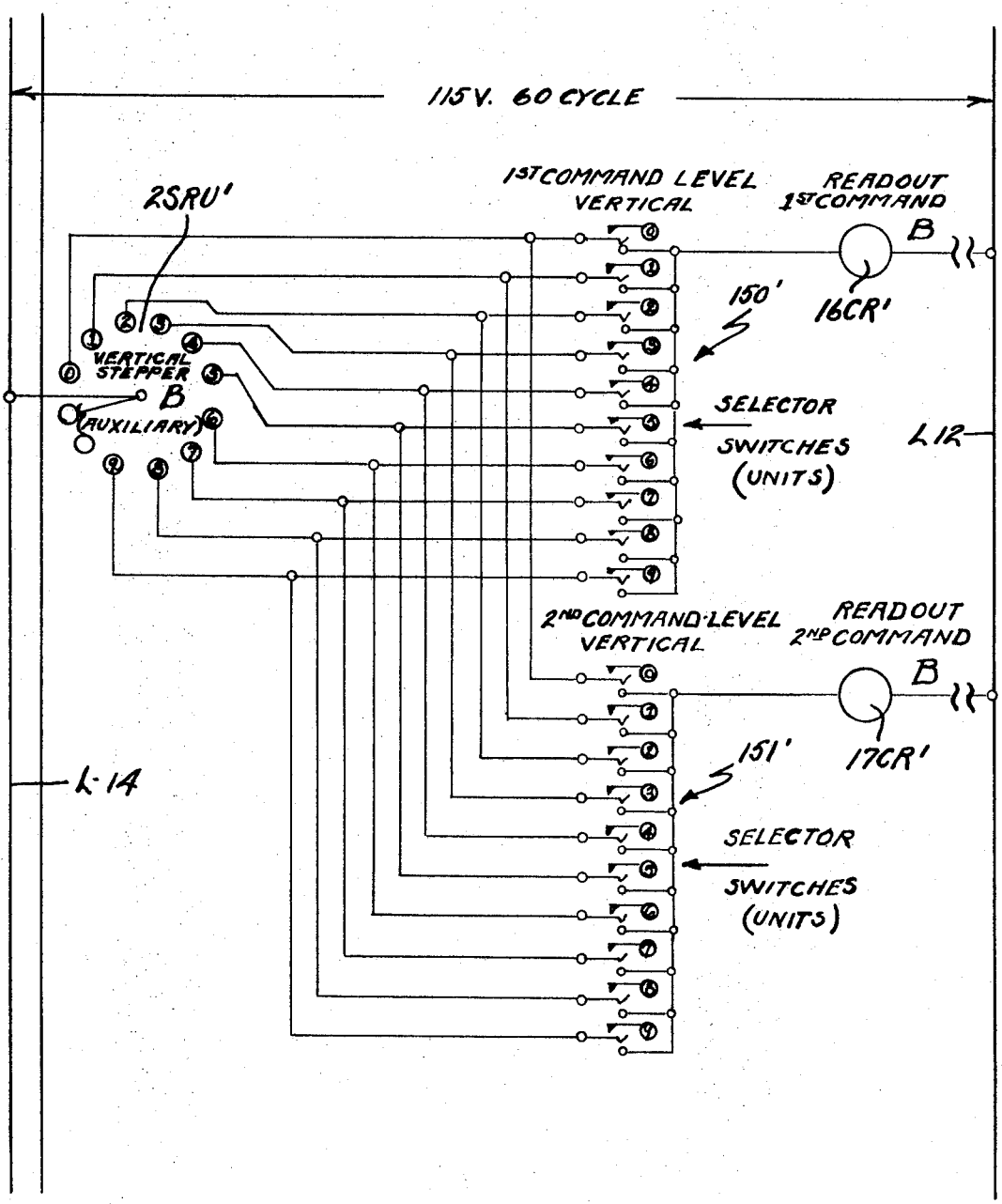
FIG. 6 is a view similar to FIG. 4 but illustrating the vertical checking stepper.
Figure 7B:
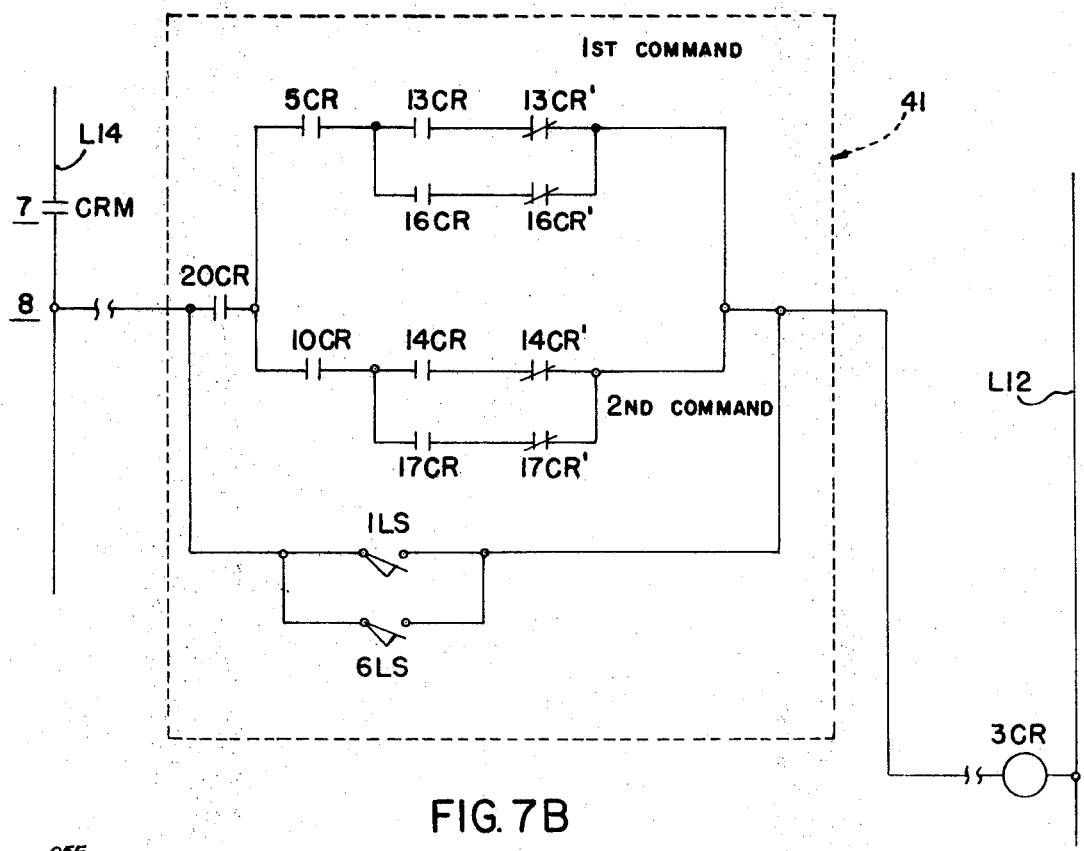
Figure 7:
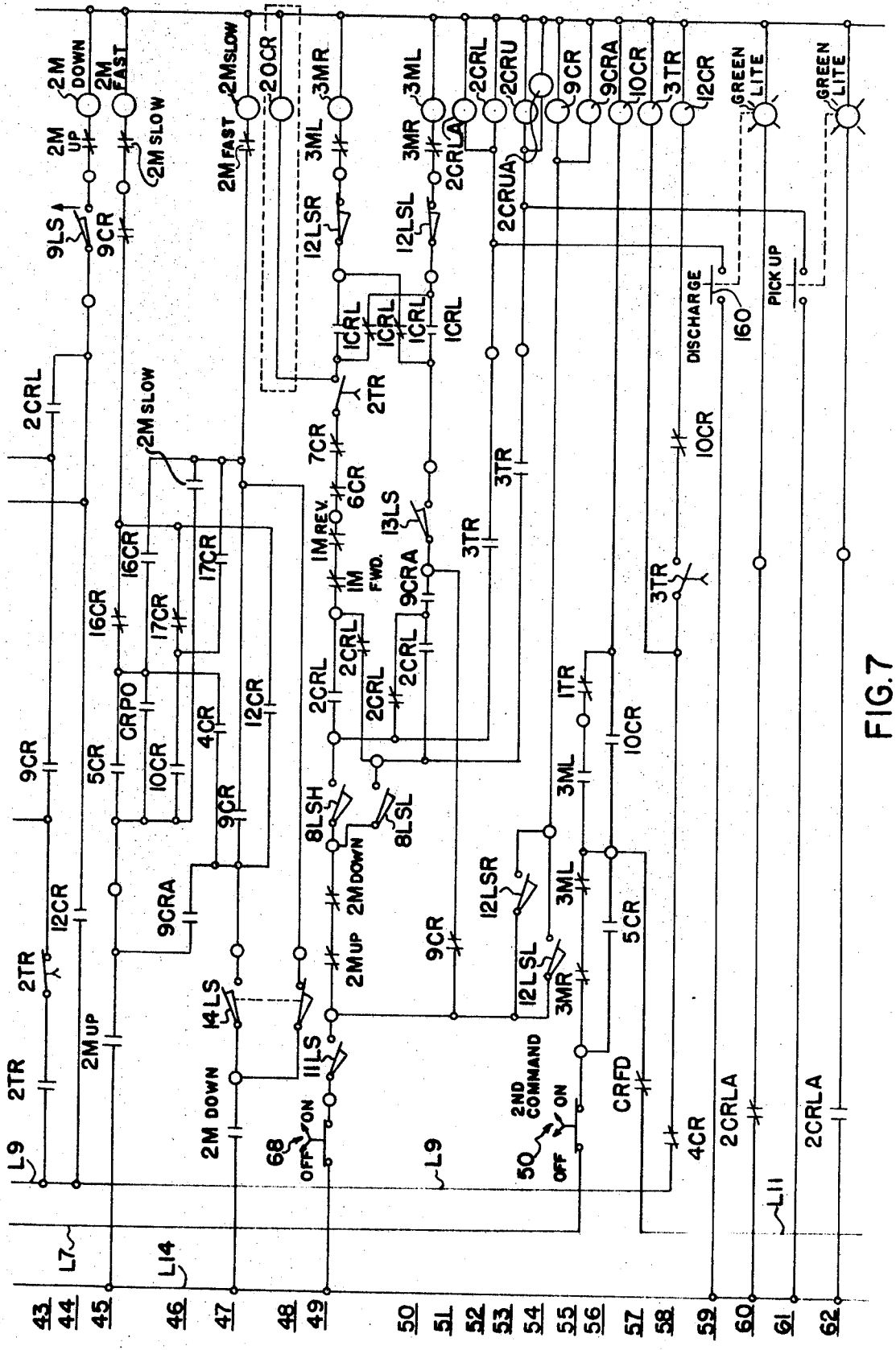

FIG. 7 is a schematic of the portion of the circuitry of the control system illustrating the circuitry for controlling the laterally movable extractor portion of the load carrier and in the same manner as FIG. 9E of Ser. No. 418,048 but showing such circuit portion as modified for coaction with the verifying relays of the FIGS. 4 and 6 checking circuitry. The changes in FIG. 7 as compared to FIG. 9E of aforementioned Ser. No. 418,048 are shown enclosed in dash lines to facilitate identification.

Figure 7A:
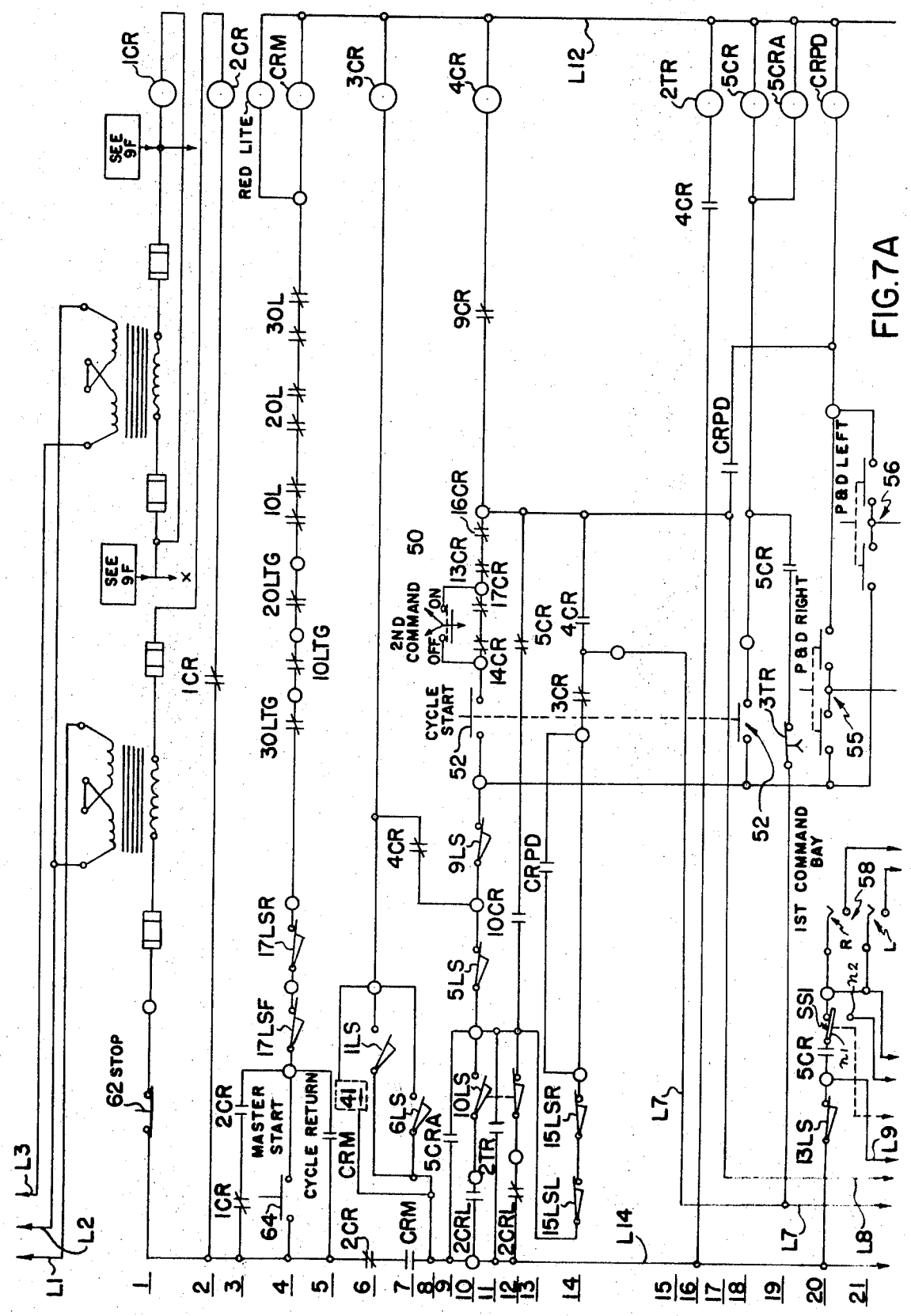

FIG. 7A is a schematic of a portion of the control circuitry for controlling positioning of the load carrier and is similar to FIG. 9B of Ser. No. 418,048 but illustrating with a dashed rectangle modifications therein incorporating circuitry of the verifying counting system and the original or primary counting system for preventing extractor operation in the event that verification of the load carrier position is not accomplished.

FIG. 7B is an enlarged detail of the extractor reject control circuitry illustrated by the dashed rectangle in line 6 of FIG. 7A.

FIG. 8 is a schematic of a further embodiment showing a checking counter circuit which is adapted in conjunction with a sensor to verify the actual position of the load carrier as compared to the programmed position of the load carrier, and wherein checking occurs at predetermined counter contacts which in the embodiment illustrated comprises every 10th load-handling storage position of the load carrier and associated storage structure.

FIG. 9 is a schematic illustration similar to FIG. 8 but showing a further embodiment wherein checking occurs at every other contact position of the stepping switch counter, and which in the embodiment illustrated comprises every even contact position and every even storage position.

FIG. 10 is a schematic of circuitry for a further embodiment of an address system of verifying load handling storage locations and shows vertical counting circuitry as taken from FIG. 9H of aforementioned Ser. No. 418,048, including both "units" and "tens" counters in circuit with the matching selector switch contacts of the programming transmitter, and in circuit with sensors which are moved by actuators into conductive condition when the load carrier arrives at a selected load-handling storage location, to verify the position of the load carrier as indicated by the counters. If verification occurs, a readout results thus causing the extractor of the load carrier to become operative to handle the load at the selected storage location.

FIG. 10A is a continuation of FIG. 10 illustrating the aforementioned verifying vertical sensors, both units and tens.

Figure 11:
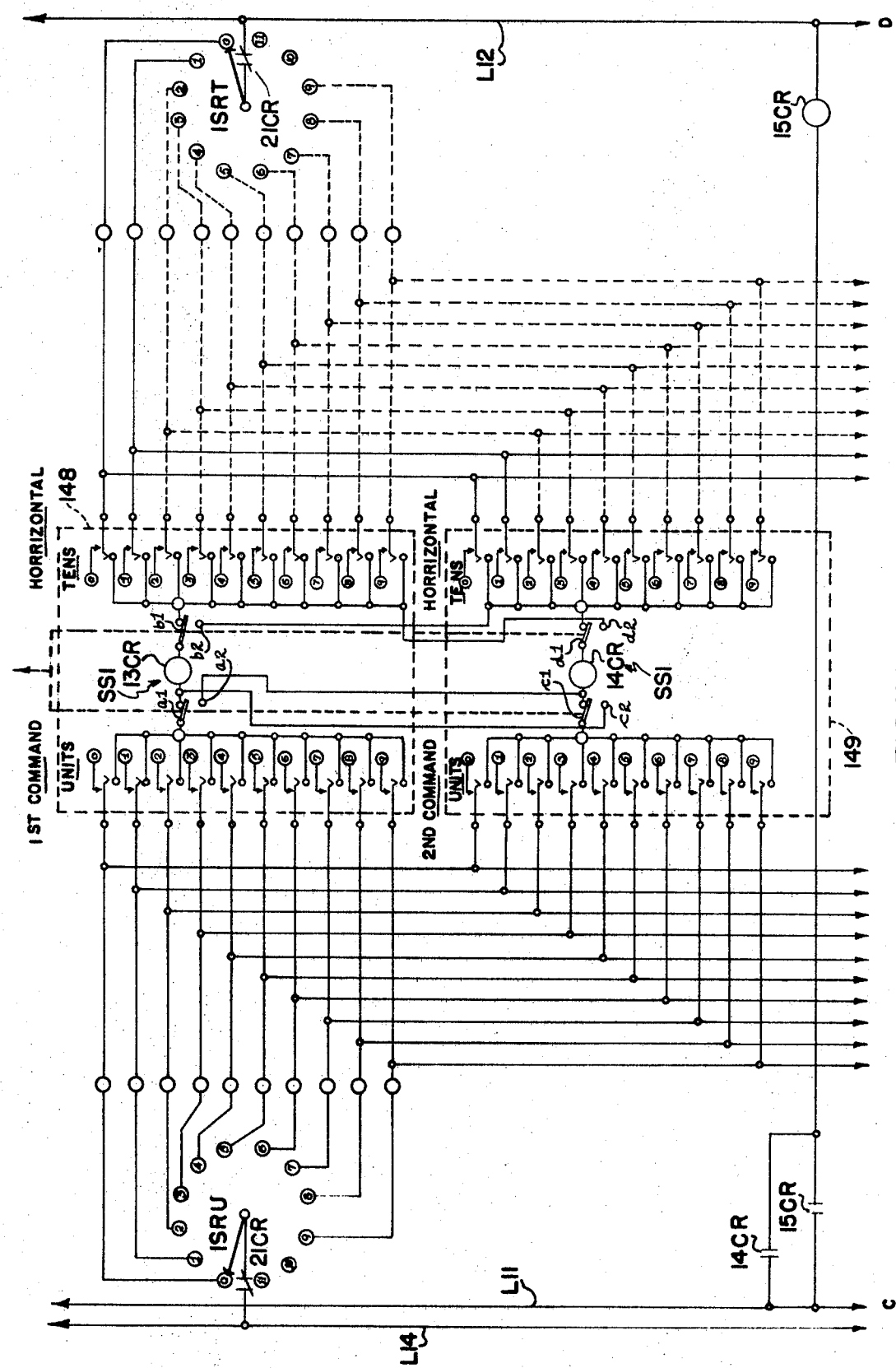

FIG. 11 is a schematic corresponding in general to FIG. 9G of aforementioned Ser. No. 418,048, and illustrating the horizontal counters, both units and tens, as coupled to horizontal verifying sensors in the same general manner as the FIG. 10 vertical counters.

FIG. 11A is a continuation of FIG. 11 illustrating the aforementioned horizontal verifying sensors.

FIG. 11B is a diagrammatic perspective view of an automatic warehousing system installation embodying the address verification system, and illustrating the horizontal verification sensors mounted on the top of the horizontally movable conveyor portion of the load carrier, and the vertical verification sensors mounted on the elevator portion.

FIG. 11C is a diagrammatic, broken view illustrating in detail a layout pattern for the address horizontal verifying sensors and associated actuators (or the address vertical verifying sensors and actuators if the pattern is rotated 90° up from the plane of the paper).

FIG. 11D is a sectional view taken along line 11D–11D of FIG. 11C, and showing a side view of one of the address sensor switches of FIG. 11C.

Figure 12:
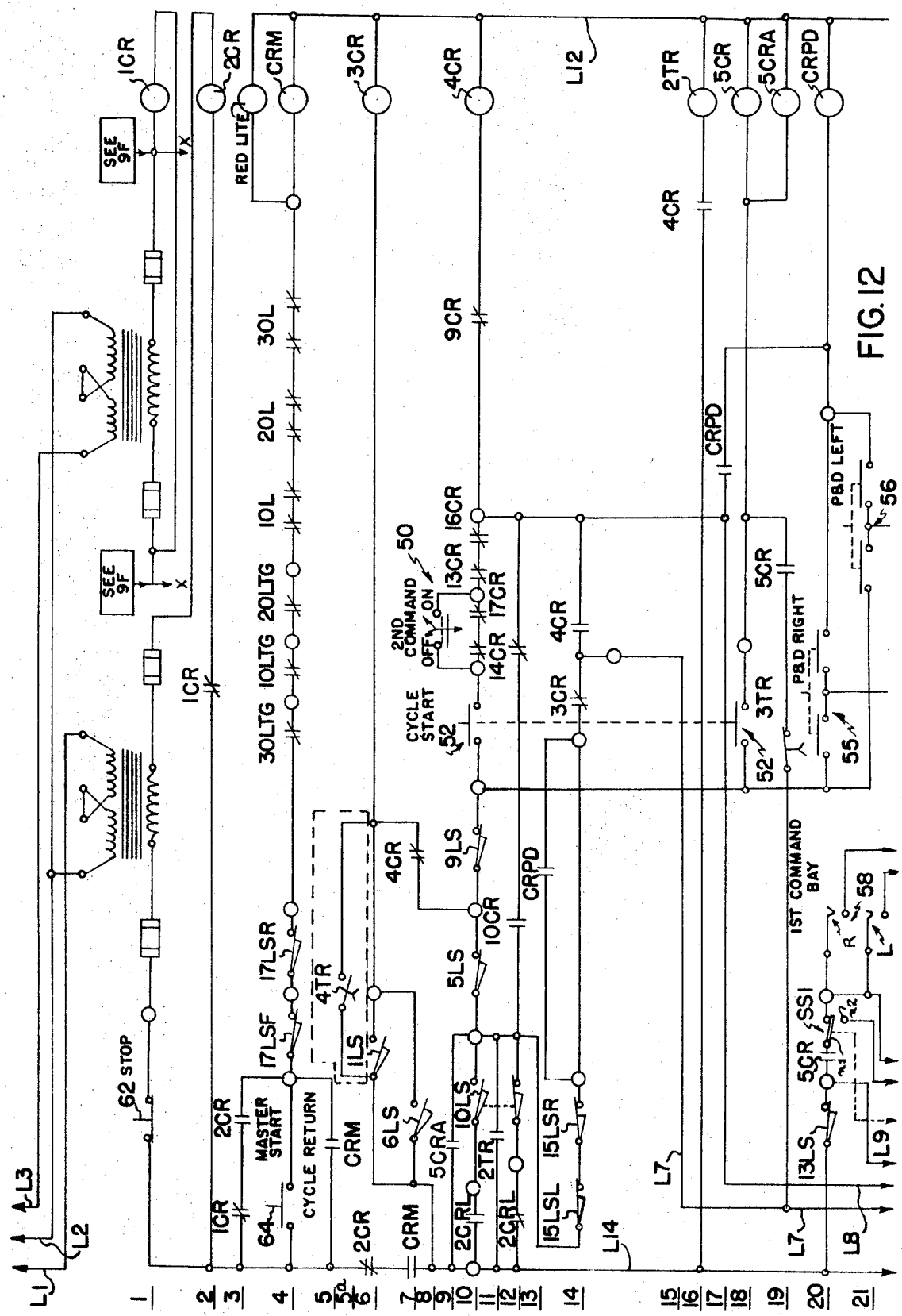
Figure 13:
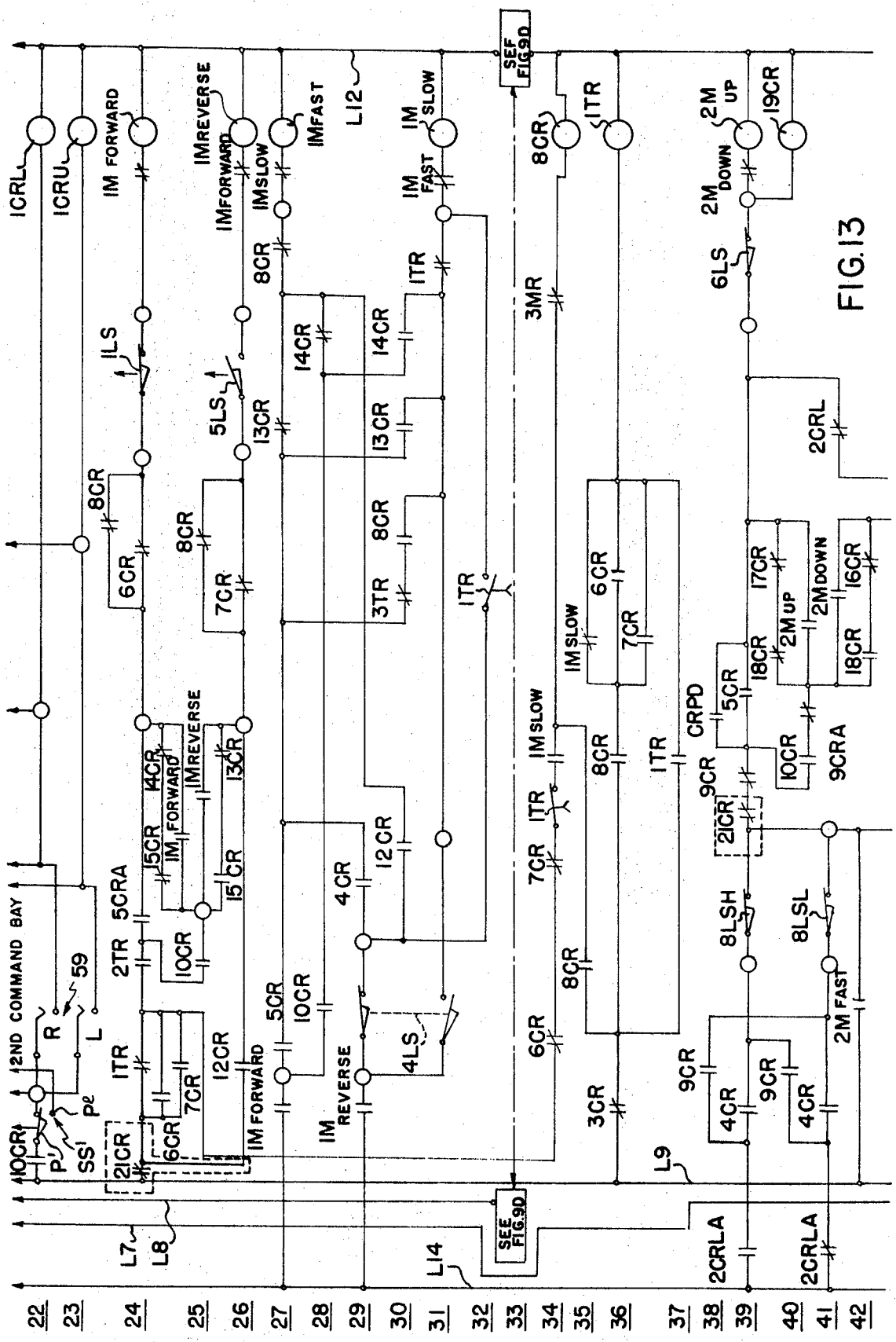
Figure 14:
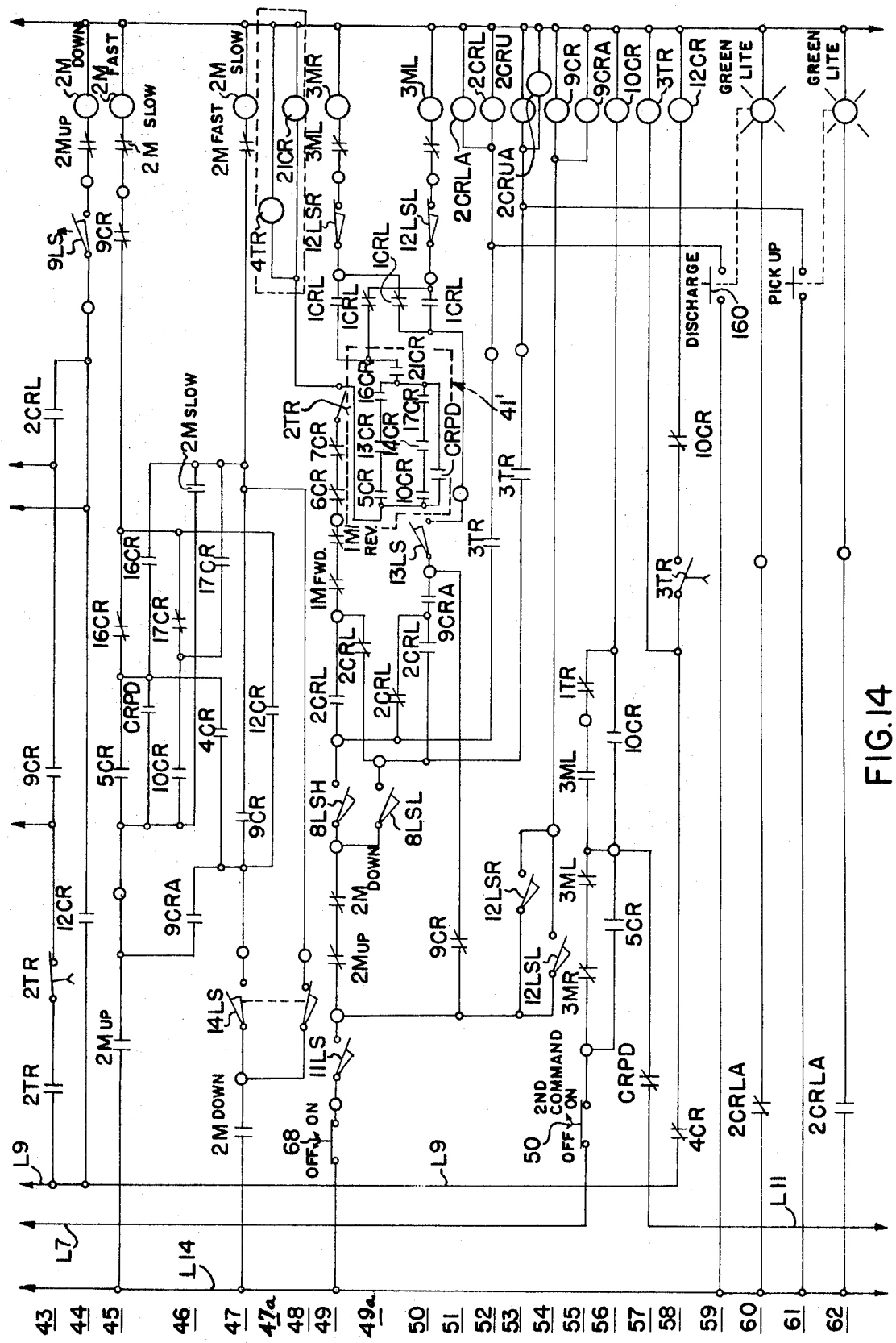

FIGS. 12, 13 and 14 are schematics of portions of the control circuitry for the load carrier, and correspond in general to respectively FIGS. 9B, 9C and 9E of aforementioned Ser. No. 418,048. The changes in FIGS. 12, 13 and 14 as compared to corresponding FIGS. 9B, 9C and 9E have been enclosed in dashed lines to aid in identification.

Referring now again to the drawings, the exemplary warehousing system illustrated comprises a skeletal storage structure or load support means 14 constructed, in the embodiment illustrated, of elongated structural members of any suitable cross section or shape. In the embodiment illustrated the storage frame has parallel storage bank sections or in other words left- and right-hand storage bank sections 16 and 18 defining therebetween a travel zone or aisle 19 so as to permit a motorized load carrier, indicated generally at 20, to be moved along the aisle or travel zone 19 and to deposit and/or retrieve a load or article from the storage bins 21 formed by each of the storage bank sections.

In the aforementioned copending U.S. Pat. application Ser. No. 418,048 there is disclosed an automatic warehousing system and control circuitry therefor of the general type with which the present arrangement is adapted for use. In such system each storage bank is constructed of a plurality of vertically extending posts 22 spaced apart by a plurality of generally horizontally extending load-supporting members 22a defining the aforementioned storage bins or storage locations. Stringers 23 may be provided tying the storage banks together into a generally rigid structure.

The aisle sides of the storage banks 16 and 18 may be provided with a pair of generally horizontally extending rails 24 defining tracks providing for supporting the load carrier 20 as it is moved therealong within the aisle or travel zone 19, with such tracks preferably extending outwardly of the storage banks for positioning the load carrier in front of the storage banks at a pickup and discharge station or stations 26, from which position the load carrier conventionally starts its movement into the aisle or travel zone to deposit or pick up loads in the storage bank sections.

The load carrier 20 may comprise upright mast structure formed with a pair of generally vertically extending track members 27, with the mast structure being secured to an intermediate horizontally oriented carriage frame 28. Carriage 28 may bridge the distance across the aisle 19 and may have wheels 30 disposed in rolling engagement with the tracks 24, thus supporting the load carrier on the tracks for horizontal movement. Such horizontally movable structure of the load carrier may be conventionally referred to as the conveyor mechanism or conveyor portion of the load carrier.

The upper and lower ends of the conveyor portion may be provided with frames 31, 31a, respectively, with generally horizontally rotatable rollers or pulleys thereon adapted for engagement with complementary rails 33 mounted on the aisle side of each storage bank, thereby guiding the upper and lower ends of the load carrier as it moves along the aisle and providing in conjunction with the carriage 28 and associated tracks 24, stabilizing engagement between the load carrier and the storage frame banks 16 and 18.

The load carrier 20 also includes a vertically movable elevator portion 35 adapted for movement along the vertical tracks 27 of the mast structure of the conveyor portion to substantially the full height of the storage frame. The elevator portion 35 may mount a load-supporting platform or extractor portion 36 thereon, which preferably provides an extensible table with such table being extendible in either of the opposed directions transverse to the direction of movement of the load carrier in the travel zone 19, so as to locate the extractor within either of the storage banks 16 or 18 effective to place the extensible table in position to deposit and/or remove a load from a selected one of the storage bins. Suitable power means such as electric motors may be provided and operatively coupled to each of the conveyor portion, the elevator portion 35, and the extractor portion 36 for actuating each of the latter. Reference may be had to the aforementioned U.S. Pat. application Ser. No. 418,048 for a detailed disclosure of such power means and their connections to the respective portion of the load carrier.

When depositing a load in a selected one of the storage bins of the storage frame, the elevator 35 and associated extractor 36 are adapted to be located opposite the selected storage bin opening such that as the load is moved into the selected storage bin by extending the extractor, the upper surface of the extractor portion 36 supporting the load is slightly above the load-supporting rail members 22a mounted on the sides of and defining the bottom extremity of the selected storage bin. When the load is completely within the confines of the bin the elevator may be lowered slightly to deposit the load onto the supporting members and permit retraction of the extractor back to its normal centered relationship with respect to the elevator.

When removing a load from the storage frame, the top surface of the extractor portion is so positioned that such top surface is slightly below the load in the selected storage bin, and then when the extractor is properly positioned beneath the load, the elevator is raised and then the extractor is moved back to its generally centered position with respect to the load carrier, to lift the load off of its respective supporting members 22a and return the extractor and associated load to a generally centered position on the load carrier.

Figure 1:
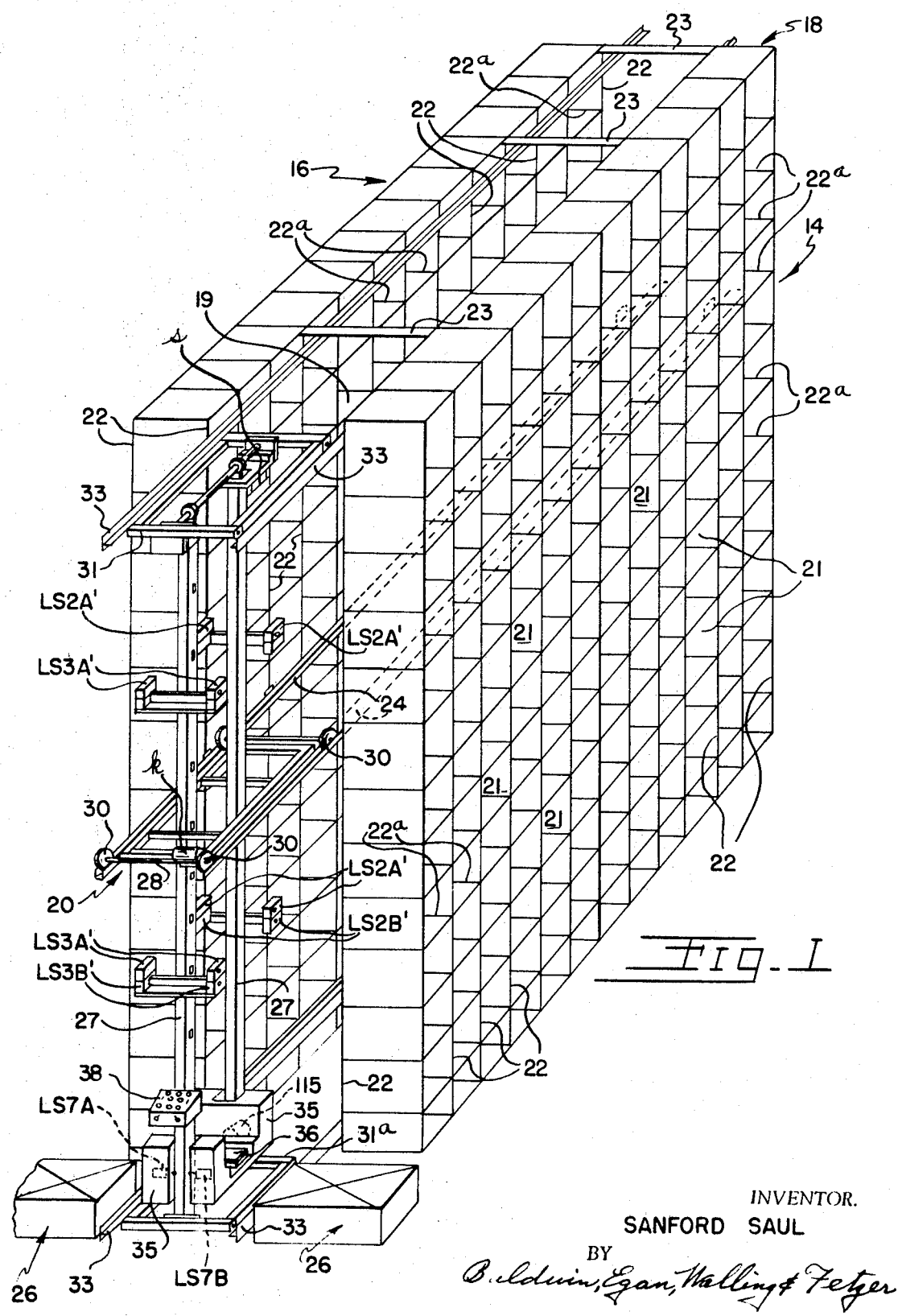

As shown in FIG. 1, the load carrier may include a control console 38 which mounts a plurality of controls thereon adapted for actuation as for instance by the warehousing operator, to program the movement of the load carrier from the pickup and discharge station to the selected load-handling position or positions in the storage frame and then usually to return back to the pickup and discharge station 26, and as described in the aforementioned copending patent application Ser. No. 418,048.

Figure 5:
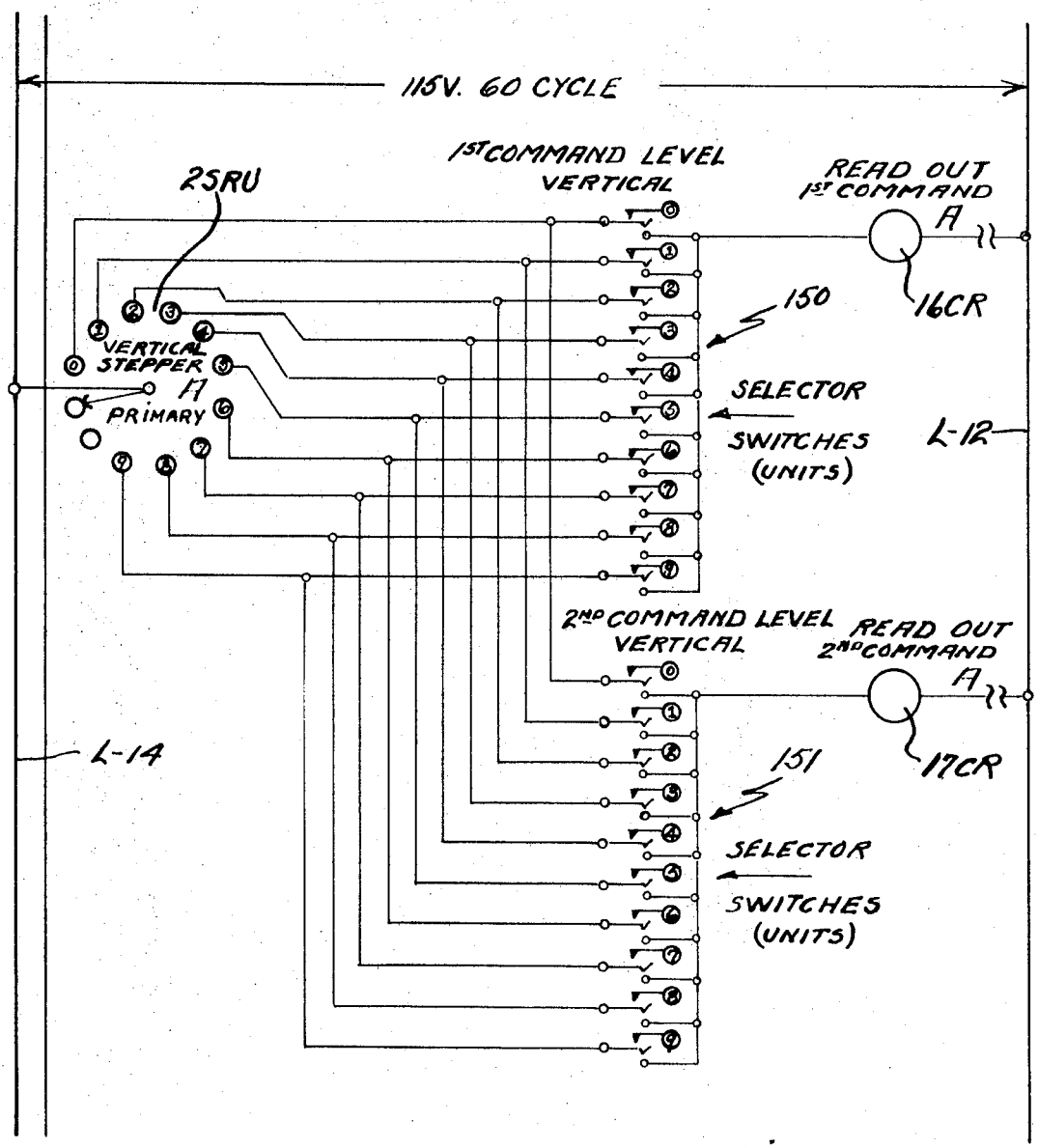
FIG. 5 is a schematic illustration similar to FIG. 3 but illustrating the original vertical stepper arrangement coupled to the selector switches and associated readout relays for the vertical control of the load carrier; and corresponds to FIG. 9H of aforementioned Ser. No. 418,048 except that the "tens" counter and associated selector switch contacts have been eliminated similarly as in FIG. 3.

As the load carrier moves down the as aisle 19 in its load-handling cycle, sensors LS2, LS3 and LS7 of the counting system for the load carrier, which sensors may be mounted on the load carrier, are actuated, and such sensors transmit a signal to counters or stepping switches 1SRU, 2SRU for actuating the latter until the position of the counters correspond to the position of the selector switches 148, 149, 150 and 151 (FIGS. 3 and 5) programmed on the console 38 of the transmitter, at which time a readout occurs and power is applied to the extractor mechanism 36 for performing its load-handling operation.

Due to possible malfunctioning of the sensors and/or the counters and associated relays, sometimes the load carrier does not accurately move to the desired bin location in the storage frame. Accordingly, in accordance with the present invention there is provided a reliability check on the functioning of the program-receiving and movement-determining circuitry of the control system for the load carrier so that it can be reliably determined that there has been no malfunctioning of the components of the control system when a readout signal occurs after the load carrier is positioned at a programmed storage bin.

Figure 2:
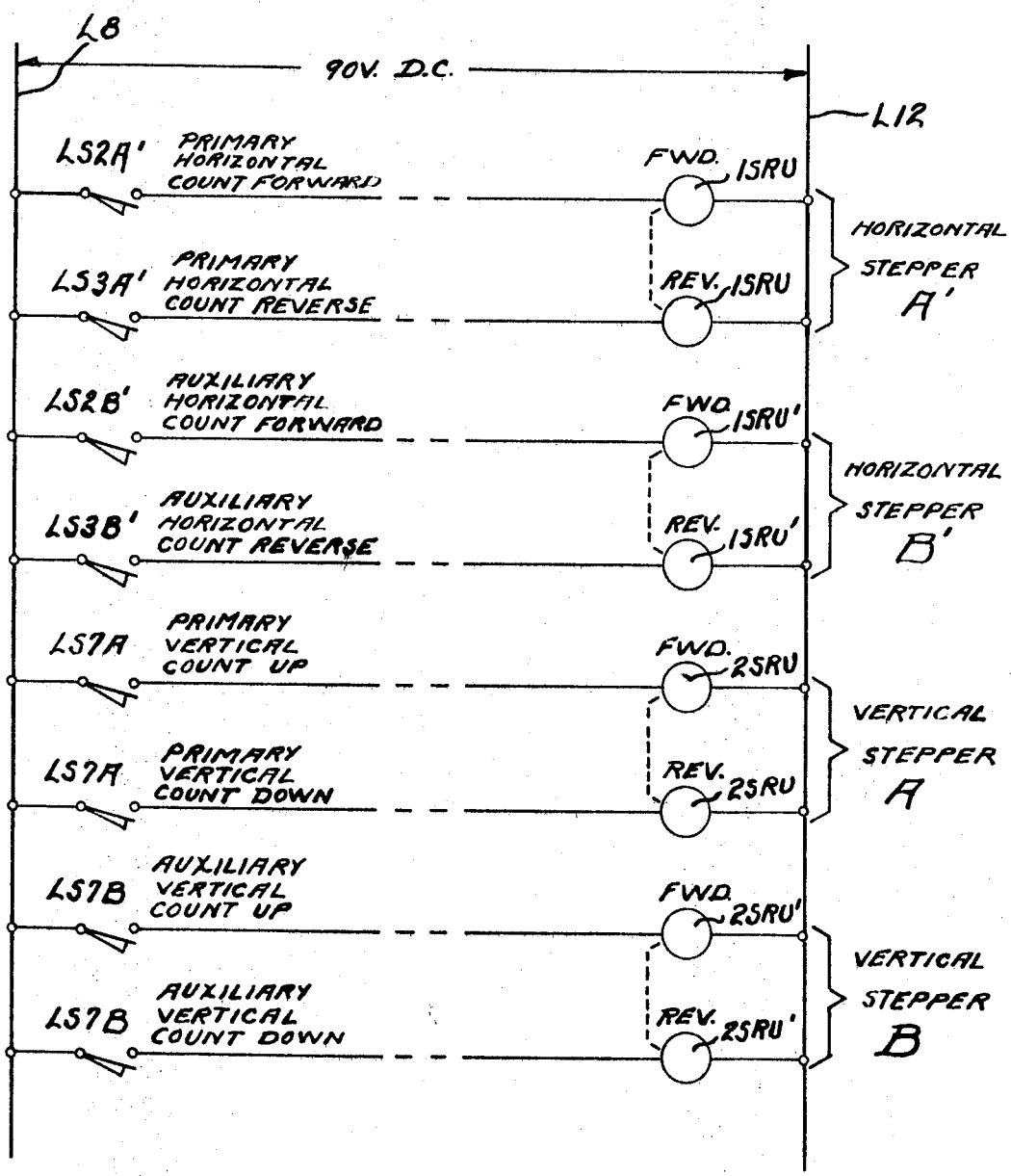

Referring now to FIGS. 1 and 2, the LS2A' primary proximity switches mounted on the conveyor portion of the load carrier sense the forward movement of the load carrier and are actuated to transmit a pulse signal as they pass the respective aisle posts 22, and upon transmission of such a pulse signal to the associated stepping switch 1SRU, the latter is stepped in conformity to the movement of the load carrier to count the storage bay posts by which the load carrier moves horizontally. During reverse movement of the load carrier back out of the travel zone 19, the primary proximity switches LS3A' actuated by the movement of the load carrier as it passes the respective aisle posts 22, pulse the counting or stepping switch 1SRU to count the storage bays past which the load carrier moves in the direction toward the pick up and discharge station 26. It will be seen that switches LS2A' and LS3A' represent the sensors of the primary counting or load carrier positioning system in the same manner and arrangement as in aforementioned Ser. No. 418,048.

Figure 4:
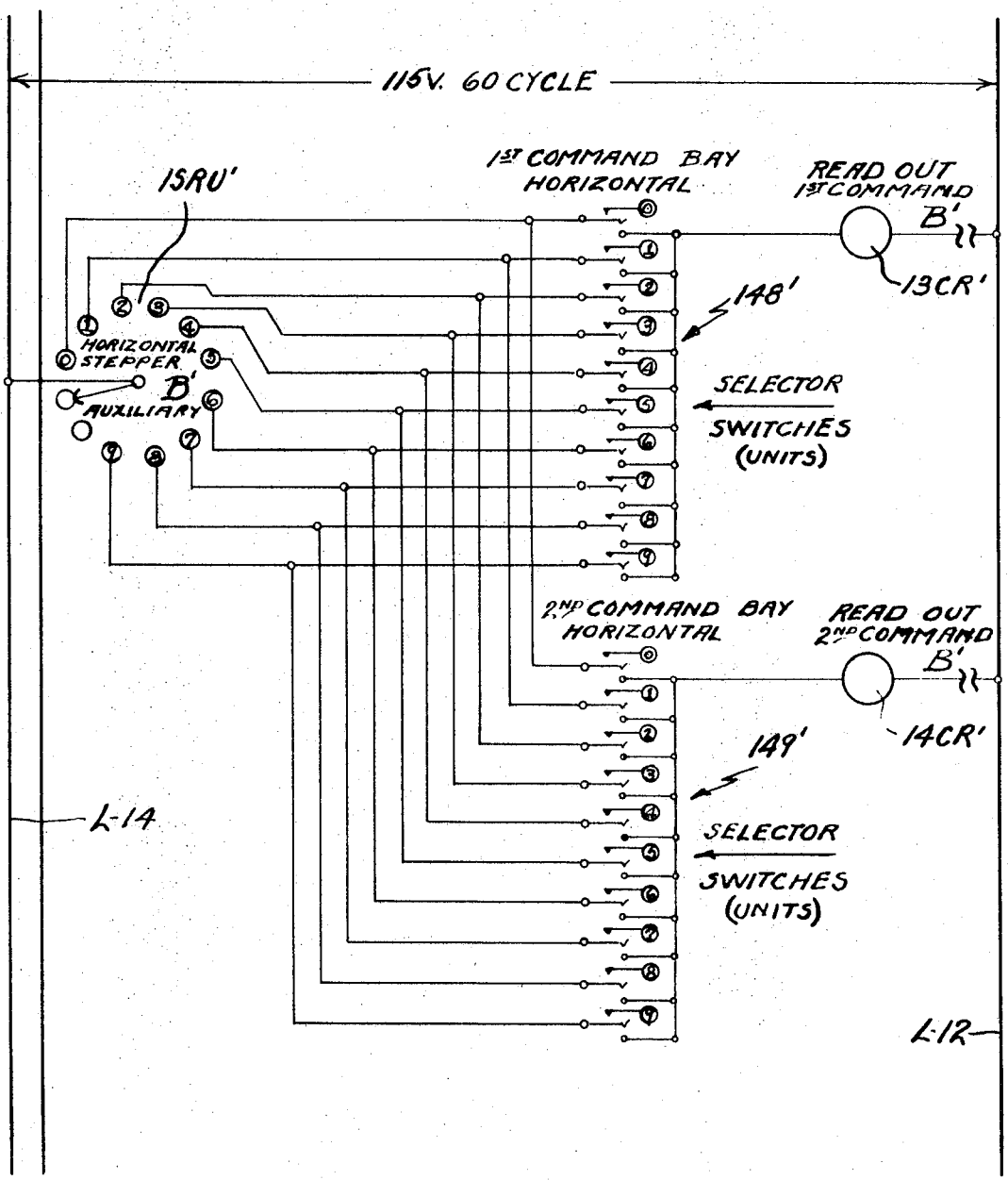

Coupled in circuit with the primary horizontal sensors and associated primary counters of the counting system, and in accordance with the invention, are auxiliary or secondary horizontal sensors LS2B' and LS3B', which are respectively coupled in circuit with auxiliary or secondary stepping switch 1SRU' (FIGS. 2 and 4). Sensors LS2B', LS3B' are mounted on the load carrier (FIG. 1) and in the embodiment illustrated are likewise actuated by the same aisle posts that actuate primary sensors LS2A', LS3A'. It will be understood that while proximity switches have been illustrated as the horizontal sensor, other types of sensors could be used, such as for instance mechanically responsive switch means, light-responsive switch means (e.g. photocells) etc.

Primary vertical sensor LS7A senses the vertical movement of the elevator and associated extractor of the load carrier in the manner described in aforementioned Ser. No. 418,048, with such vertical counting sensor means being preferably mounted on the elevator for coaction with actuating lugs, pins, or the like mounted on the vertical tracks 27 as disclosed in aforementioned Ser. No. 418,048, so that upon vertical movement of the elevator, such vertical movement is sensed by the sensing device LS7A, thus pulsing the associated vertical stepping switch or counter 2SRU to count the bin levels past which the elevator portion of the load carrier moves to the selected storage location.

In accordance with the present invention, there is provided auxiliary or supplementary sensor switch LS7B which senses the vertical movements (both up and down) of the elevator and wherein auxiliary sensor LS7B is coupled to auxiliary vertical stepping switch 2SRU'. Auxiliary sensor switch LS7B may be mounted on the elevator similarly to sensor LS7A (FIG. 1) and may have its own set of actuators or lugs mounted on mast structure 17 for actuation of switch 7LSB. It will be seen therefore that in effect there has been provided two independent counting systems for counting horizontally and vertically.

Figure 3:
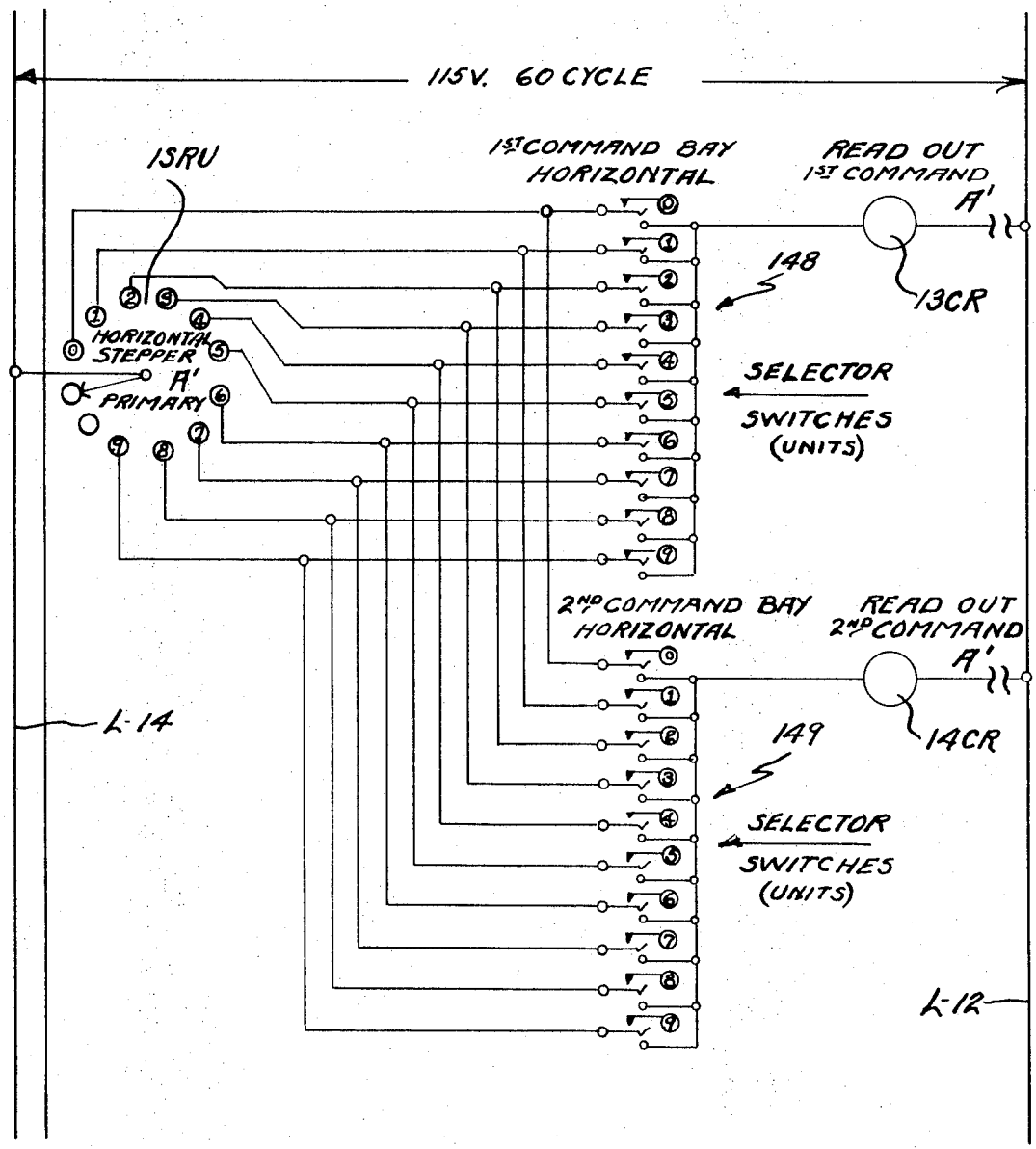

Referring now to FIG. 3 it will be seen that the primary horizontal stepper switch 1SRU has each of its stationary contacts coupled to a respective selector switch contact of first and second command switch banks 148, 149, located in the embodiment illustrated on the control console 38 of the load carrier, and that when the movable contact of the stepping switch or counter 1SRU coacts with one of the fixed contacts of the stepper switch which is in circuit with an actuated selector switch contact on the control console, a readout occurs due to energization of readout control relay 13CR for the first horizontal command position, or readout relay 14CR for the second horizontal command position, and in the manner described in aforementioned patent application Ser. No. 418,048. The auxiliary horizontal counter or stepping switch 1SRU' likewise has each of its fixed contacts coupled to a matching contact of the selector switches of auxiliary switch banks 148', 149' on the control console. It will be understood that the switch contacts of auxiliary switch banks 148', 149' are automatically actuated upon actuation of the corresponding switch contacts of switch banks 148, 149. When a matching occurs between the movable contact on the auxiliary counter or stepping switch 1SRU' and an actuated selector switch contact of switch banks 148', 149', energization of the readout relay 13CR' or 14CR' occurs to actuate the associated verifying readout contact 13CR' or 14CR'. Energization of such verifying readout relays is used to verify that the position of the load carrier as indicated by the primary counting means corresponds to the position of the load carrier as indicated by the auxiliary counting system. If the horizontal position of the load carrier as indicated by the auxiliary horizontal counting system matches the position of the load carrier as indicated by the primary counting system, then extractor motion occurs to handle a load at the selected load storage location. However, if the position of the load carrier as indicated by the auxiliary counting system does not correspond to the position indicated by the primary counting system, then a reject occurs and the extractor is prevented from handling a load at the existing position of the load carrier, and the latter is returned to its starting position.

Figure 6B:
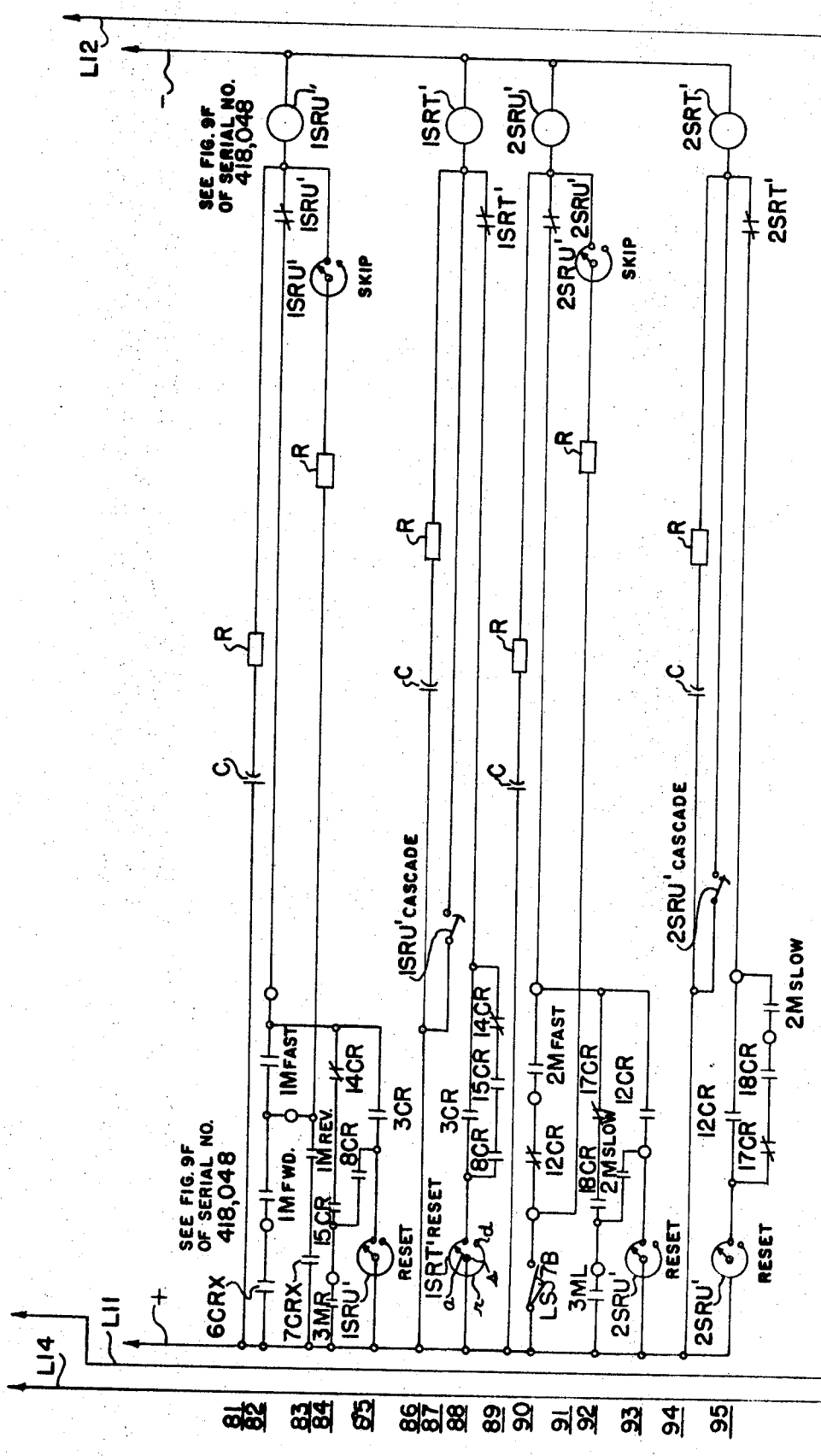
FIG. 6B is a schematic illustrating the control circuitry for stepping the auxiliary counters of the auxiliary counting system and is generally similar to FIG. 9F of Ser. No. 418,048.
Figure 6A:
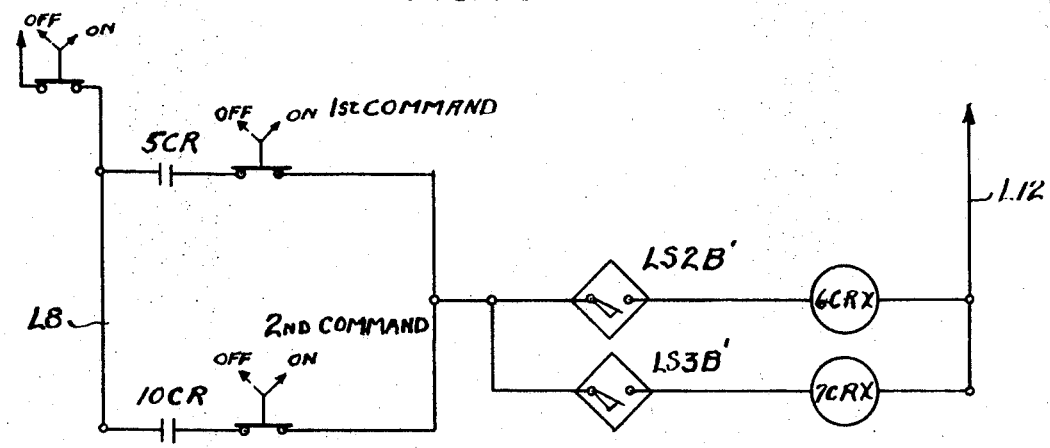
FIG. 6A is a schematic illustrating the auxiliary horizontal sensors for the auxiliary horizontal stepper of FIG. 4.

FIG. 6A illustrates auxiliary horizontal sensors LS2B' and LS3B' (for sensing forward and reverse horizontal movement of the load carrier in a similar manner as primary horizontal sensors LS2A' and LS3A') coupled in circuit with auxiliary relays 6CRX and 7CRX respectively, and FIG. 6B illustrates the circuitry for stepping the auxiliary counters 1SRU' etc. and 2SRU' etc. of the auxiliary load-positioning or counting system each time the auxiliary proximity sensors LS2B' and LS3B' are actuated by movement of the sensors into proximity with the associated vertical posts 22 of the storage structure, to provide the verifying count for the load carrier as it moves in horizontal directions. It will be understood therefore that the operation of the auxiliary counting system is the same as that described for the primary counting system described in aforementioned Ser. No. 418,048.

The same duplicate counting exists for the vertical counting system, with the primary vertical stepper or counter 2SRU (FIG. 5) in circuit with the vertical selector switch contacts of switch bank 150 on the control console, and causing energization of the associated readout control relay 16CR or relay 17CR in the manner set forth in Ser. No. 418,048, and with the auxiliary or secondary vertical stepping switch or counter 2SRU' (FIG. 6) when it matches up with an associated actuated selector switch contact of auxiliary switch banks 150', 151', causing energization of the associated readout control relay 16CR' or relay 17CR' and in the same manner as for the primary vertical counting system. It will be understood that in FIGS. 3 through 6 only the "units" counters have been illustrated, but that the primary and auxiliary counting systems with a warehouse having over 10 bays and 10 bin levels would each also incorporate therein the "tens" counters similar to the arrangement shown and described in Ser. No. 418,048.

Referring now to FIG. 7 which discloses the circuitry for controlling energization of the motor control relays 3MR and 3ML of the extractor motor 115 of the load carrier, this schematic is generally identical to FIG. 9E oF Ser. No. 418,048 except that a relay 20CR has been placed in circuit with the extractor controls (line 49) just after timer contact 2TR. This added control element area has been outlined with a dashed lined rectangle for facilitating identification thereof. The operation of the load carrier in its vertical and horizontal movements to a selected storage location or bin and the lateral movement of the extractor to handle a load at such bin have been described in Ser. No. 418,048. Suffice it to say that when the load carrier is in confronting relation to a selected bin after horizontal and vertical positioning movements, limit switch contact 11LS and one or the other of limit switch contacts 8LSH and 8LSL (depending on whether a load is to be deposited into or withdrawn from the bin) will have been closed in line 49 of FIG. 7. When timer contact 2TR (line 49—FIG. 7) closes (timer 2TR being energized due to 4CR being energized) energization of aforementioned relay 20CR will occur, as will be apparent from FIG. 7.

Referring now to FIGS. 7A and 7B, FIG. 7A is generally identical to FIG. 9B of Ser. No. 418,048 except that a dashed line rectangle identified by reference numeral 41 has been placed in line 6 thereof to show the addition of the verifying circuitry which prevents actuation of the extractor motor relays 3MR and 3ML, if the position of the load carrier as indicated by the auxiliary counting system of FIGS. 4, 6, 6A and 6B does not match with that indicated by the primary counting system. The circuitry within aforementioned rectangle 41 is illustrated in FIG. 7B. Assuming for instance that the load carrier has moved to a first load-handling position (i.e. first command position) it will be seen from FIG. 7B that when relay 20CR (FIG. 7) becomes energized, its contact 20CR (FIG. 7B) closes. Normally open contact 5CR will have been closed due to the energization of relay 5CR as described in Ser. No. 418,014, and normally open horizontal and vertical readout relay contacts 13CR and 16CR of the primary counting system will have been closed due to energization of horizontal and vertical readout relays 13CR and 16CR respectively FIGS. 3 and 5) of the primary counting system and as aforementioned. Now if the horizontal and vertical readout relays 13CR' and 16CR' of the auxiliary counting system FIGS. 4 and 6) are also energized at the then existing position of the load carrier to verify the primary load carrier positioning or counting system, normally closed contacts 13CR' and 16CR' (FIG. 7B) will be opened thereby preventing energization of reject relay 3CR (line 6—FIG. 7A). Accordingly after timer contact 2TR (line 49, FIG. 7) closes as aforedescribed, one or the other of the extractor motor control relays 3MR or 3ML will be energized to cause actuation of the extractor 36 to handle a load at the existing position of the load carrier which has been verified as the selected first command position.

However, if one or both of the verifying readout relays 13CR' and/or 16CR' do not become energized as aforedescribed due to the auxiliary steppers (e.g. 1SRU' or 2SRU') not being matched or synchronized with the corresponding steppers of the primary counting system, then one or both of verifying readout contacts 13CR' and 16CR' of the common output-verifying circuitry 41 (FIG. 7B) will remain closed and energization of reject relay 3CR (line 6—FIG. 7A) will occur.

Energization of relay 3CR will cause relay 4CR (line 10—FIG. 7A) and relay 2TR (line 16—FIG. 7A) to drop out and will cause energization of relay coil 3TR (line 57—FIG. 7). When relay 3TR times out, the 3TR contact (line 58—FIG. 7) closes to energize relay coil 12CR (line 58—FIG. 7). Thus relay 1M Reverse, relay 1M Fast (lines 26 and 27 respectively of FIG. 9C of Ser. No. 418,048) and relays 2M Down and 2M Fast (lines 44 and 45 respectively of FIG. 7) are energized, and the load carrier is moved back toward its starting position, which in the embodiment illustrated is the pickup and discharge station 26. Accordingly, it will be seen that a checking verification of the correct positioning of the load carrier at a selected storage bin will have been accomplished. It will be seen therefore that if due to some malfunctioning of one or more of the components of the primary load carrier positioning or counting system, so that the load carrier is not at the proper selected load storage location, this deficiency will be sensed by the auxiliary or verifying counting system and thus energization of the respective auxiliary readout control relays (e.g. 13CR', 14CR', 16CR' and 17CR') can not occur, thereby preventing the extractor-cycling circuitry from attempting to either place a load in or remove a load from the storage frame at the then existing location of the load carrier.

Referring now to FIGS. 8 and 9 there is schematically disclosed verifying arrangements wherein spot checking of the primary counting or load carrier positioning system with the actual location of the load carrier, may be accomplished at predetermined intervals. This spot checking verification can be accomplished by including a verifying sensor means, such as for instance a mechanically responsive normally open limit switch LS-1, or a photoelectric cell or magnetically responsive proximity switch mounted for instance on the load carrier, and which is actuated by some tripping device or actuator located at predetermined intervals along the path of movement of the load carrier in either its vertical or horizontal planes depending on which direction of movement of the load carrier the sensor is adapted for sensing. The actuators for sensor LS-1 may be mounted for instance on the storage structure, and the sensor for sensing the horizontal movement of the load carrier may be mounted on the conveyor portion of the load carrier, while the corresponding sensor for sensing the vertical movement of the load carrier may be mounted on the elevator portion thereof. It will be understood that FIGS. 8 and 9 illustrate the arrangement for sensing movement of the load carrier only in a horizontal or in a vertical direction and that to sense the other direction, a duplicate circuit will be required, and in the same general manner as the duplicate circuits for vertical and horizontal sensing illustrated in the first described embodiment.

The verifying counter or stepper 1SRU" or 2SRU" will be stepped in the same manner as the verifying counters of the first-described embodiment with selected stationary contacts of the counter being connected in circuit with readout relay 22CR (FIG. 8) or readout relay 22CR' (FIG. 9). When the movable contact of the counter engages the stationary contact in circuit with the readout relay, energization of the latter occurs, to cause the corresponding normally closed relay contact (either 22CR or 22CR') to open, thereby keeping out reject relay 3CR'. It will be seen that unless readout relay 22CR or 22CR' is energized, the associated relay contact 22CR or 22CR' remains closed. If the associated sensor LS1 (FIG. 8) or LS1' (FIG. 9) is closed due to the position of the load carrier as controlled by the primary counting system, the reject relay 3CR' will be energized to initiate a reject and prevent extractor operation, which reject cycle may be generally similar to that described in the first embodiment of the invention. A check at every 10th bay or 10th aisle post may be adequate (FIG. 8) or a check may be made at each even position of the movable contact of the associated verifying counter or stepping switch (FIG. 9), or at each odd position, or any other combination desired.

FIG. 9 presents a similar arrangement as that of FIG. 8 except that a check is made at every other position of the counter rather than at only one position of the counter, and in the illustration illustrated at every even position. Operation is the same except that the sensor LS-1' operates at every even position (e.g. level or bay) of the storage structure. Accordingly, it will be seen that a checking is made only at predetermined locations to determine if the load carrier is in proper position at a selected storage bin prior to actuation of the extractor of the load carrier to either deposit a load into or remove a load from the selected storage bin. This spot checking arrangement results in a more economical verifying system as compared to the first-described embodiment, and while it is not as comprehensive as the full checking provided by the first embodiment, it will be satisfactory for some warehousing systems.

Referring now to FIGS. 10 thru 14 there is disclosed a further embodiment of verification, and again as illustrated in conjunction with a control system of the type disclosed in aforementioned Ser. No. 418,048. This type of verification will hereinafter be referred to as address checking or verification. In FIG. 10 there is illustrated the vertical counting system for the load carrier identical to that disclosed in Ser. No. 418,048 including the stepping switches 2SRU, 2SRT and the switch banks 150, 151, embodying therein the vertical selector switches which are adapted for actuation to define the load level to which the elevator of the load carrier is adapted to move for either inserting a load into or removing a load from a selected storage bin. Coupled to each of the fixed contacts of the selector switches of switch banks 150, 151 is a respective sensor referred to generally by reference numbers 200, 200a. It will be seen that sensors are provided for both the "units" counter and the "tens" counter of the system. In the embodiment illustrated such sensors have been shown as mechanically responsive limit switches, but it will be understood that other sensing devices such as photoelectric or magnetic responsive, etc., may be used in place of the mechanically responsive sensors. These vertical or level sensors 200, 200a may be mounted as a group on the elevator of the load carrier (FIG. 11B) for movement therewith and each of the sensors will be actuated by an associated actuator 203, mounted in the embodiment illustrated on a respective arm 205 extending from the mast structure 27, as the elevator of the load carrier moves to the selected level as determined by the selector switch bank 150, 151 as aforedescribed. Sensors 200, 200a are coupled to respectively the power lead L11 and the ground lead L12 by normally open contacts 21CR (FIG. 10A) of relay 21CR (line 48, FIG. 14).

With either the left or right switch of the first command bay switch 58 being previously closed by the operator for programming the extension of the extractor table either left or right, as described in Ser. No. 418,048, when one of the limit switches 8LSH or 8LSL is closed due to positioning of the elevator either high or low, depending on whether a load is to be deposited into or removed from the first selected storage location, the coil of either relay 2ML or 3MR is adapted to become energized effective to power the table drive motor 115 to extend the table or extractor into the confronting bin. Referring now however to FIG. 14 it will be seen that prior to operation of the extractor motor 115, aforementioned relay 21CR (line 48) becomes energized upon closing of either of the elevator-positioning switch contacts 8LSH or 8LSL (line 49—FIG. 14). The normally closed contacts 21CR in circuit with each of the counters 2SRU and 2SRT (FIG. 10) of the vertical counting system for the load carrier thus open, isolating the counters from respectively the power and ground leads L14 and L12 and aforementioned normally open contacts 21CR in circuit with address sensors 200, 200a (FIG. 10A) close, thus placing the actuated sensors in circuit with the corresponding actuated selector switches of the switch banks 148, 149. If the position of the load carrier as indicated by the actuated of the sensors 200, 200a corresponds to the position of the load carrier as indicated by the matching selector switches of switch banks 150, 151, then energization of the associated first command vertical readout relay 16CR (FIG. 10) occurs. A similar operation likewise takes place at the second command load-handling position with vertical readout relay 17CR becoming energized if the actuated sensor as determined by the actual level position of the elevator matches the second command position indicated by the second command bank 151 of selector switches.

Operation of the horizontal counting system (FIG. 11) for the load carrier control is the same as described in aforementioned Ser. No. 418,048, with however horizontal units and tens address sensors 200', 200a' (FIGS. 11A and 11B) being connected in circuit with the horizontal selector switch banks similarly to the aforementioned vertical sensors 200, 200a connection with the vertical selector switch banks. Horizontal address sensors 200', 200a' may be mounted on the conveyor portion of the load carrier and are actuated in the embodiment illustrated by actuators 208 (FIGS. 11B, 11C) carried by stringers 23. Normally open 21CR relay contacts (FIG. 11A) couple the horizontal "units" and "tens" sensors to respectively the power lead L11 and ground lead L12, and normally closed 21CR contacts couple the horizontal "units" and "tens" counters 1SRU and 1SRT to respectively power lead L14 and ground lead L12 in a similar manner as aforedescribed for the vertical counters.

It will be seen from FIG. 14, lines 49—51 that the normally open contacts 13CR and 16CR of the first command readout relays of respectively the horizontal and vertical counters are in series with one another and with normally open contact 5CR of control relay 5CR, and with the normally open contacts 14CR and 17CR of the second command readout relays of respectively the horizontal and vertical counters likewise being in series with one another and with normally open contact 10CR of second command control relay 10CR, and in parallel with the aforementioned first command readout contacts of the common output-verifying circuitry 41'. Normally open contact 21CR (Line 50, FIG. 14) is in series with the aforementioned readout relay contacts and with extractor motor relays 3MR and 3ML.

Accordingly, if the actuated vertical and horizontal address sensors as determined by the position of the load carrier match with the actuated selector switches, then it will be seen that energization of the associated readout relays will occur to cause closing of the relay contacts in the extractor control circuit (FIG. 14), For instance, assume that vertical units selector switch 8 of vertical switch bank 150 (FIG. 10) has been actuated and horizontal units selector switch 8 of horizontal switch bank 148 (FIG. 11) has likewise been actuated for directing the load carrier to bay 8 and bin level 8 in the storage structure. When the load carrier arrives at the selected storage bin locations, if the load carrier positioning system has operated properly, then vertical sensor switch 8 of units group 200 and sensor switch O of tens group 200a (FIG. 10A) on the elevator should have been closed by its associated actuator on the mast structure 27, (FIG. 11B) and horizontal sensor switch 8 of units group 200' and switch O of tens group 200a' (FIG. 11A) on the conveyor portion of the load carrier should likewise be in closed condition due to actuation by its associated actuator on the storage structure. Accordingly, vertical readout relay 16CR and horizontal readout relay 13CR (FIGS. 10 and 11 respectively) will become energized, thus closing the normally open switch contacts 13CR and 16CR in the extractor control circuit (line 49a, FIG. 14) thus causing energization of one of the motor relays 3MR or 3ML to cause actuation of the extractor and handling of the load at the selected load storage location or bin.

However, if the address verification does not check out, or in other words if the verifying sensor of vertical and horizontal sensor groups 200, 200a, 200', 200a' do not match with the actuated selector switches of the vertical and horizontal selector switch banks 150, 148, then energization of the readout relays 16CR and 13CR will not occur, and a reject exists.

If verification does not occur as above described, then timer relay 4TR (line 47a, FIG. 14) which became energized upon energization of relay 21CR, times out and timer contact 4TR (line 5a, FIG. 12) closes to energize reject relay 3CR (line 53, FIG. 12). Energization of reject relay 3CR will cause relay 4CR (line 10, FIG. 12) and relay 2TR (line 16—FIG. 12) to drop out and will cause energization of relay 3TR (line 57—FIG. 14) and return of the load carrier back to its starting position (e.g. the pickup and discharge station 26) in the manner aforedescribed in connection with the first-described embodiment. In this connection, it will be seen that normally closed 21CR contact in line 24, FIG. 13, which opened upon energization of relay 21CR, closes once again when relay 2TR drops out, to permit energization of relay 1M Reverse (line 26, FIG. 13), and return of the load carrier to its starting position. It will be seen therefore that the selector switch groups 200, 200a, 200', 200a' as actuated by positioning of the load carrier locating circuitry for the warehousing system.

From the foregoing discussion and accompanying drawings it will be seen that the invention provides an automatic warehousing system including a load-handling carrier for delivering and picking up loads at a plurality of load storage locations in the storage structure of the system, and including control means for the load carrier for controlling the actuation and positioning of the latter to a selected load storage location, together with means coacting with the control means for verifying the position of the load carrier as indicated by the control means for the selected load storage location. In one embodiment the verifying means takes the form of a duplicate counting system including its own actuating sensors, counters and selector switch banks, for verifying the primary counting system, so that both sets of steppers or counters must match with each other as well as with the programmed information of the selector before a readout signal can be transmitted to the power means which controls the operation of the extractor. In another embodiment the verifying means includes means for spot checking certain positions of the load carrier as designated by the load carrier counting or positioning means, and including sensor means responsive to movement of the load carrier to certain of said storage locations corresponding to the spot checked positions, for causing energization of means preventing actuation of the load carrier to deliver a load or pick up a load from a selected storage location if verification does not occur at the checking positions. In another embodiment the verifying means takes the form of address sensor means which are individually actuated at each storage location, and before extractor motion can begin within the storage structure, a check is made between the programming means and the load carrier location as determined by the sensor means at the respective storage location. If the check is verified, the extractor proceeds to handle a load at the selected location, but if not verified, return of the load carrier to its starting position is initiated.

The terms and expressions which have been used have been used as terms of description and not of limitation and there is no intention in the use of such terms and expressions of excluding any equivalents of any of the features shown or described, or portions thereof.

What I claim is:

1. In an automatic warehousing system having a storage structure and a load-handling carrier for delivering and picking up loads at a plurality of load storage locations in said storage structure, control means for said load carrier for controlling actuation of the latter to the selected load storage locations, and means coacting with said control means for verifying the position of said load carrier as indicated by said control means for the selected load storage location, said control means and said verifying means both including separate and independent signal-producing means for respectively signalling the position of said load carrier in said storage structure, a common output means to which said signal-producing means are operatively coupled, and means responsive to said output means to prevent actuation of said load carrier to handle a load at the then confronting storage location if the load carrier position as indicated by said control means fails to match the corresponding position as indicated by said verifying means.

2. A system in accordance with claim 1 wherein said control means includes selector means and counting means comprising said signal-producing means of said control means coacting with said selector means for controlling the movement of said load carrier to the selected load storage location, and said verifying means includes duplicate counting means comprising said signal-producing means of said verifying means in circuit with the first-mentioned counting means, and control elements in circuit with said counting means and said output means for permitting actuation of said load carrier to pick up or deposit a load at a selected load storage location only when said counting means are in synchronism with one another.

3. A system in accordance with claim 1 wherein said control means includes selector means and counting means comprising said signal-producing means of said control means coacting with said selector means for controlling the movement of said load carrier to the selected load storage location, and said verifying means includes sensor means comprising said signal-producing means of said verifying means operable to sense the position of said load carrier and in conjunction with said output means and said responsive means operable to permit actuation of said load carrier to pick up or deposit a load only in the event that the position of said load carrier as indicated by said sensor means corresponds to the position of said load carrier as indicated by said selector means.

4. A system in accordance with claim 3 wherein said sensor means comprises mechanically responsive switch means actuated into conductive condition by movement of said load carrier to said selected storage location to cause checking of said load carrier position.

5. A system in accordance with claim 3 wherein said sensor means comprises light-responsive switch means actuated into conductive condition by movement of said load carrier to said selected storage location to cause checking of said load carrier position.

6. A system in accordance with claim 3 wherein said sensor means comprises magnetically responsive switch means actuated into conductive condition by movement of said load carrier to said selected storage location to cause checking of said load carrier position.

7. A system in accordance with claim 1 wherein said storage structure includes a pickup and discharge station from which said load carrier commences its movement to deposit a load into or withdraw a load from a selected load storage location, and wherein said control means includes means operable to cause said load carrier to return to said pickup and discharge station in the event that the position of the load carrier as indicated by said verifying means does not correspond to the position of the load carrier as indicated by said control means.

8. A system in accordance with claim 1 wherein said control means includes selector means comprising switch means for each of said storage locations in said storage structure, and being adapted to be selectively actuated to define one or more load-handling storage locations to which said load carrier is adapted to move during a load-handling cycle, and said signal-producing means of said verifying means including means for checking the position of said load carrier as designated by said selector means for each of said storage locations.

9. A system in accordance with claim 1 wherein said control means includes selector means comprising switch means for each of said storage locations in said storage structure, and being adapted to be selectively actuated to define one or more load-handling storage locations to which said load carrier is adapted to move during a load-handling cycle, and said signal-producing means of said verifying means including means for checking the position of said load carrier as designated by only certain of said selector means for the storage locations, the last-mentioned checking means being responsive to movement of said load carrier to certain of said storage locations corresponding to said certain selector means for causing energization of said means preventing actuation of said load carrier to deliver a load or pick up a load from the selected storage location in the event that the position of the load carrier as indicated by said verifying means does not correspond to the position of said load carrier as indicated by said control means.

10. A system in accordance with claim 1 wherein said load carrier is movable horizontally and vertically to a selected load storage location and laterally into and out of the storage structure to deposit and to pick up loads, motor power means for actuating said load carrier, said control means being connected to said power means, said control means including selector means for selecting to which of said load storage locations said load carrier will move upon actuation thereof and said verifying means verifying the accuracy of the positioning of the load carrier at a selected load storage location as indicated by said selector means prior to said lateral movement of said load carrier to handle a load at the selected storage location.

11. A system in accordance with claim 1 wherein said load carrier comprises a generally horizontally movable conveyor portion, an elevator portion movable generally vertically on said conveyor portion, and an extractor portion mounted on said elevator portion and adapted for lateral movement with respect thereto to deposit and pickup loads at selected storage locations in said storage structure, said verifying means including means operative to verify both the horizontal and vertical positioning movements of said load carrier in said storage structure.

12. In an automatic warehousing system having a storage structure and a load-handling carrier for delivering and picking up loads at a plurality of load storage locations in said storage structure, control means for said load carrier for controlling the actuation of the latter to the selected load storage locations, and means coacting with said control means for verifying the position of said load carrier as indicated by said control means for the selected storage location, said load carrier comprising a generally horizontally movable conveyor portion, an elevator portion movable generally vertically on said conveyor portion and an extractor portion mounted on said elevator portion adapted for lateral movement with respect thereto to deposit and pick up loads at selected storage locations in said storage structure, motor power means for actuating said load carrier, said control means being operably coupled to said power means, said control means including selector means for selecting to which of said load storage locations said load carrier will move upon actuation thereof, sensor means for sensing the horizontal and vertical movements of said load carrier and means for receiving commands and determining movements of said load carrier to the selected load storage locations via actuation of said power means, said verifying means coacting with said command-receiving and movement-determining means for verifying the accuracy of the positioning of the load carrier at a selected load storage location as indicated by said selector means prior to said lateral movement of said extractor portion of said load carrier to handle a load at the selected load storage location, and wherein said command-receiving and movement-determining means includes first stepping switch means adapted to be actuated in step fashion by said sensor means as said load carrier moves to a selected load storage location effective to actuate said control means and deenergize said motor power means to stop movement of said load carrier at a selected load-handling storage location, and said verifying means including other sensor means and second stepping switch means, said other sensor means being adapted to sense the horizontal and vertical movements of said load carrier independently of the first-mentioned sensor means and to actuate said second stepping switch means in step fashion as said load carrier moves to the selected storage location, and a common output means in circuit with said stepping switch means and responsive to the latter, and reject means responsive to said output means to prevent actuation of said extractor portion to handle a load at the then confronting load storage location, if the load carrier position as indicated by said control means fails to match the load carrier position indicated by said verifying means.